US012810199B2

(12) United States Patent
Watt et al.

(10) Patent No.: US 12,810,199 B2
(45) Date of Patent: Nov. 24, 2026

(54) MACHINE LEARNING ARCHITECTURE FOR QUANTIFYING AND MONITORING EVENT-BASED RISK

(71) Applicant: ROYAL BANK OF CANADA, Toronto (CA)

(72) Inventors: Graham Alexander Watt, Toronto (CA); Layli Sadat Goldoozian, Toronto (CA); James Ross, Toronto (CA); Xiwu Liu, Toronto (CA); Di Xin Zhang, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 1040 days.

(21) Appl. No.: 17/901,766

(22) Filed: Sep. 1, 2022

(65) Prior Publication Data

US 2023/0076243 A1 Mar. 9, 2023

Related U.S. Application Data

(60) Provisional application No. 63/239,706, filed on Sep. 1, 2021.

(51) Int. Cl.

*G06N 20/00* (2019.01)
*G06N 20/20* (2019.01)
*G06Q 30/0201* (2023.01)
*G06Q 40/03* (2023.01)
*G06Q 40/06* (2012.01)
*G06Q 40/08* (2012.01)

(Continued)

(52) U.S. Cl.

CPC ............. *G06N 20/00* (2019.01); *G06N 20/20* (2019.01); *G06Q 30/0201* (2013.01);

(Continued)

(58) Field of Classification Search

CPC .... G06Q 30/0201; G06Q 40/03; G06Q 40/06; G06Q 40/08; G06Q 50/16; G06Q 10/04;

(Continued)

(56) References Cited

U.S. PATENT DOCUMENTS

2018/0173727 A1* 6/2018 Kreutzer ............. G06F 12/0893
2018/0300601 A1* 10/2018 Cedola .................. G06F 1/3275

(Continued)

OTHER PUBLICATIONS

Risner, "Quantifying the Impact of Remapping Floodplains on Residential Property Values in Snohomish County, Washington: A Hedonic Approach", Jun. 13, 2021, Central Washington University, archived at https://web.archive.org/web/20210613224042/https://digitalcommons.cwu.edu/etd/1509/ (Year: 2021).*

(Continued)

*Primary Examiner* — Reji Kartholy

(74) *Attorney, Agent, or Firm* — Norton Rose Fulbright Canada LLP

(57) ABSTRACT

An automated machine learning approach and toolkit is developed for evaluating the causal impact of an event. This approach includes data generation, optimal model selection, model stability evaluation and model explanation. An example approach includes: generating predictive output data of physical geospatial objects is proposed whereby a first data set representative of geospatial event-based data and a second data set representative of the characteristics of the physical geospatial objects are spatially joined together and utilized to generate a causal graph data model that is then provided for at least one of a trained regression machine learning model, a trained causal machine learning model, and a trained similarity machine learning model to generate the predictive output data representative of event-adjusted characteristics of the physical geospatial objects.

20 Claims, 19 Drawing Sheets

(51) Int. Cl.
*G06Q 50/16* (2012.01)

(52) U.S. Cl.
CPC ............. *G06Q 40/03* (2023.01); *G06Q 40/06* (2013.01); *G06Q 40/08* (2013.01); *G06Q 50/16* (2013.01)

(58) Field of Classification Search
CPC .... G06Q 10/0635; G06Q 50/26; G06N 20/00; G06N 20/20; G06N 5/01; Y02A 10/40
See application file for complete search history.

(56) References Cited

U.S. PATENT DOCUMENTS

| | | | | |
|---|---|---|---|---|
| 2018/0329958 | A1* | 11/2018 | Choudhury | G06F 16/2456 |
| 2023/0013320 | A1* | 1/2023 | Eller | G06Q 40/06 |

OTHER PUBLICATIONS

Sharma et al., "DoWhy: An End-to-End Library for Causal Inference", 2020, arXiv, v1, pp. 1-5 (Year: 2020).*

Bontempi et al., "From Dependency to Causality: A Machine Learning Approach", 2015, Journal of Machine Learning Research, vol. 16 (2015), pp. 2437-2457 (Year: 2015).*

Gillespie, "Valuing natural amenities and flood risk: a hedonic house price approach", Mar. 2021, J.E. Cairnes School of Business and Economics the National University of Ireland Galway (Year: 2021).*

Qin et al., "Study on the relationship between house rent and people congestion by time in Tokyo based on mobile phone GPS data", 2019, 2019 IEEE International Conference on Big Data (Big Data), vol. 2019, pp. 5313-5320 (Year: 2019).*

* cited by examiner

Casual graph

800

900

1000

1100

1200

1300

1400

$$
\textbf{\textit{flood}} = \begin{cases} 1, & ((distance\_costal\_water + E1) < 1000 \textbf{ or } (distance\_lakes\_and\_rivers + E2) < 200) \\ 0, & otherwise \end{cases}
$$

$E1 \sim N(0, 100)$ $E2 \sim N(0, 10)$ $$
\begin{aligned}
\textbf{\textit{price}} = 50000 + {} & treatment\_effect \times flood \\
& + 6000 \times is\_detached \\
& + 0.1 \times average\_income \\
& - 0.001 \times (distance\_lakes\_and\_rivers)^2 \\
& - 0.1 \times distance\_costal\_water \\
& + 100 \times (size)^{.5} \\
& - 500 \times property\_age \\
& + E3
\end{aligned}
$$

$E3 \sim N(0, 1000)$

FIG. 14

1500

| True treatment effect | Estimated treatment effect (mean, std) | | |
|---|---|---|---|
| | linear_model | causal_ml | similarity_model |
| -500 | (-3997.26, 64.31) | (-451.01, 86.28) | (-198.89, 25.26) |
| -1000 | (-4504.66, 71.27) | (-968.4, 93.82) | (-681.15, 24.39) |
| -4000 | (-7457.74, 67.11) | (-4189.99, 117.0) | (-3686.35, 26.77) |
| -8000 | (-11519.29, 56.77) | (-8124.88, 141.3) | (-7685.56, 26.63) |
| -16000 | (-19505.34, 67.88) | (-15700.07, 160.15) | (-15690.21, 23.92) |

FIG. 15

MACHINE LEARNING ARCHITECTURE FOR QUANTIFYING AND MONITORING EVENT-BASED RISK

CROSS-REFERENCE

This application is a non-provisional of, and claims all benefit, including priority to, U.S. Application No. 63/239,706, filed 1 Sep. 2021, entitled: MACHINE LEARNING ARCHITECTURE FOR QUANTIFYING AND MONITORING EVENT-BASED RISK. This document is incorporated by reference in its entirety.

FIELD

Embodiments of the present disclosure generally relate to the field of machine learning, and more specifically, embodiments relate to devices, systems and methods for providing machine learning architectures for quantifying and monitoring event-based risks.

INTRODUCTION

The complexity and required computing times for computational models modelling phenomena quickly scale up as a number of dimensions under consideration increase, especially as the factors typically have complex non-linear relationships and interdependencies.

For example, physical risk to infrastructure has been identified as one of the top six areas of climate change risk in Canada. It is desirable to adapt methods to assess the effect (perceived and expected damages) of physical hazard likelihood on the value of entities/assets, which is a critical component of risk assessments and management, among others.

SUMMARY

A hybrid machine learning based system for the quantification and monitoring of physical risks (e.g., climate risk) in respect of potentially occurring events to a characteristic (e.g., property value) using a statistical and machine learning architecture is proposed in various embodiments herein. While some example embodiments are directed to climate risks and property values, not all embodiments are thus limited. As described herein, a machine learning approach is proposed whereby geospatial polygons (e.g., risk-zone polygons) are combined with characteristic data for training one or more machine learning model architectures using causal graph learning, in some embodiments, as an input to drive different machine learning models, such as a regression machine learning model, a causal machine learning model, and/or a similarity model. The models can then be used to generate different output data sets, such as adjusted risk models and distances to high risk zones, etc., based on particular geospatial positions and/or regions (e.g., a polygon for a particular house).

Further output data sets can then be derived using the geospatial positions and/or regions for a particular asset and compared against other data to generate secondary output data sets, such as whether the asset associated with the geospatial position and/or region is under/over-priced after adjustment for geospatial risk characteristics. This is particularly useful as compared to simple region-based approaches, such as zoning by area or postal codes, which is used, for example, in current insurance adjustment approaches. A challenge with the simple region-based approaches is that the one-size fits all approach for regions is a poor estimation tool. For example, a house on a relative hill, even if in a region susceptible to heavy precipitation, has significantly different risk profile and impact characteristics compared to a neighboring house that has a slightly decreased elevation or a undesirable slope face relative. However, if both houses are in a same zip-code region, the insurance assessment could be extremely unfair to the first house, and may cause it to be uninsurable, despite the actual flood risk. Using the approach provided herein, the first house could actually be deemed not to be as severe of a flood risk due to increased granularity and complexity in the computational approach.

This is also particularly useful because there is an information asymmetry and low awareness of event based risk/hazards at the property level. For example, a house buyer often does not know if the house is in a flood zone, so that factor is often not explicitly accounted for in the price. The system can be configured to provide decision support interfaces adapted to inform areas of high and low awareness to hazards and quantify the appropriate property value change. This is important information for mortgage clients, for example, but also for mortgage portfolio management because, if for example, flood maps or other data became readily available overnight, then the value of a portfolio and risk profile (e.g., loan/value) would change quickly. The system is able to quantify this impact now, and over time, to inform risk management/client strategies.

Assessing geospatial characteristics in analysis can be very complex, for example, assessing elevation, slope, drainage density, erosion characteristics, local flora, build characteristics/specifications, and depending on the granularity and resolution of the data, significant computing power may be required despite having limited computing resources. Accordingly, a balance needs to be made in respect of depth of analysis and efficient use of limited computing resources, such as processing power, available storage, and processing time.

Accordingly, a machine learning model is proposed that receives as inputs, a first input data set of event occurrence data (e.g., flood occurrence data) and a second input data set of a characteristic being monitored (e.g., property data). Both of the first input data set and the second input data set have geospatial characteristics, and in some embodiments, can include groups of data objects that are geospatially located, for example, based on a Euclidean or Cartesian coordinate system. The data objects may be spatially represented as locations having physical boundaries, and may be simplified into voxel type objects, such as polygonal shapes, among others, for ease of computation. The first input data set and the second input data set do not necessarily need to utilize the same underlying schema for the geospatial characteristics (e.g., rainfall zones can be regular polygon based, while properties can be denoted more accurately through surveyed property boundaries, etc.).

The first input data set and the second input data set are coupled together using a spatial join to create an aggregated input data set (e.g., flood occurrence combined with property values or characteristics), and this aggregated input data set is utilized as inputs into at least three different maintained machine learning models, including (i) a regression machine learning model, (ii) a causal machine learning model, and (iii) a similarity machine learning model. The aggregated input data set is also utilized for causal graph learning, and the outputs from causal graph learning are also provided into the (i) regression machine learning model, (ii) causal machine learning model, and (iii) similarity machine learning models. The approach can utilize, in some embodiments, a model selection process whereby multiple models are used concurrently or simultaneously such that a computational process can then be run automatically to select a best model. As described further, an experiment was conducted on simulated data that identified that, in the experiment, that DML (orthogonal/double machine learning) was superior to DRL (doubly robust learning). This has been mentioned in some other places in the document too. The similarity model is a methodology independent of causal approaches and does not consume the results of causal graph learning, only using aggregated input data.

As described in a variant embodiment herein, a further approach to share the processing load is to cache or otherwise maintain a global causal graph model that is updated periodically whenever geospatial data or other data is being used to train models for generating predictive inputs. The global causal graph model can be based on different types of geospatial elements (e.g., geospatial events, geospatial locations), linking together the elements using a weighted graph model whose values are refined to reduce an error or loss function based on the training sets. As the training sets can demonstrate correlation through validation against ground truth, a benefit of using the global causal graph model is that computationally heavy processing can be spread across many training epochs for otherwise unrelated queries run by different entities, and the global causal graph latently tracks the relationships between different geospatial elements without requiring any prior knowledge of the underlying relationships, which can be very complex and non-linear. Furthermore, given practical limitations on surveys and study information that are available at a particular time, some variables may not be observed or available in the data and the global causal graph latently accounts for these aspects as well. The global causal graph for a particular region of interest can thus train asynchronously and over a larger set of epochs, and can be provided as an input signal into some of the machine learning models, which may aid those models in being selected during the training process from an ensemble of candidate models.

The outputs of the (i) regression machine learning model, (ii) causal machine learning model, and (iii) similarity machine learning models are then combined together and optimized to obtain a first output data set, and the first output data set is then refined to generate the second output data set.

The first output data set can be utilized, for example, for analyses including, determinations of whether property is at risk of event occurrence (e.g., flood), whether asset characteristics (e.g., property value) considers event occurrence, and quantifications of price differential for asset given event occurrence risk, asset characteristics given event occurrence risk, value differential of asset characteristics when in multiple event occurrence zones, and changes in effect of event occurrence on asset characteristics over time. The first output data set can also be utilized to generate estimates that consider various event occurrence return periods (e.g., 20, 50, 100, 200, 500, 1500 years).

The second output data set (Set 2) can be utilized for establishing spatial aggregations and dimensions compared against asset characteristic (e.g., property value), such as (property, PC, FSA, DA, Distance to flood, CMA, etc.) of the first output data set (Set 1).

Potential outputs can include, for example, aggregated data outputs, such as data that is grouped by, union aggregate or other tabular or spatial operations to create meaningful representations of risk by location. For example, individual property information can be aggregated to the census metropolitan area (CMA), allowing comparison of physical risk awareness by CMA to inform management and policy strategy (e.g., targeted awareness campaigns).

Corresponding systems, methods, and non-transitory computer readable media storing machine interpretable instructions are contemplated.

The system can be implemented as a server or implemented as a special purpose computing appliance (e.g., a rack mounted appliance) that resides in a data center and coupled to a message bus for receiving geospatial and asset characteristic data sets, and maintains the trained models and/or trained causal graphs as computer representations on coupled data storage. Models can be trained for a specific region or in response to a specific query based on available historical information, and then deployed for prediction generation. Multiple models can be trained simultaneously and then compared against a validation set for selecting which model should be deployed for production usage. The predictions are generated in the form of output logits representing a value from passing the inputs through a transform function defined by the latent space. The output logits can be normalized and utilized to control aspects of a decision support interface or automatically initiate computer data processes representing downstream computing functionality, such as automatically setting mortgage premiums, setting flags to require remediation activities or fortified building codes before insurance policies can be sold on a particular property, etc.

A variant of the system can be utilized to generate a graphical user interface having interactive display control elements modified based on the outputs of the system to compare asset prices in the market as compared to the adjusted price, and for example, colors or other visual indicia can be utilized to show that a particular asset is underpriced, overpriced, etc. relative to the adjusted risk profile as output by the candidate model. This can be used, for example, as a decision support interface for a realtor or a user so that they can make an informed purchasing decision. As new geospatial data (e.g., flood maps, climate change, historical information) become available, the models can be re-run to assess new adjusted values. A further variant of the system is an on-line system adapted to continuously update based on new data sets as new data is received (e.g., current rain/climate data) so that assessments of geospatial elements and assets can be continuously or periodically updated as time progresses. This is especially useful in a period of evolving climate risks as a tool for monitoring environmental change and generating alerts thereof.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIG. 14 is an example approach for simulation of data, according to some embodiments.

FIG. 15 is an example table showing simulation results, according to some embodiments. In FIG. 15, three models are being compared.

DETAILED DESCRIPTION

A hybrid machine-learning based system for the quantification and monitoring of physical risks (e.g., climate risk) in respect of potentially occurring events to a characteristic (e.g., property value) using a statistical and machine learning architecture is proposed in various embodiments herein. While some example embodiments are directed to climate risks and property values, not all embodiments are thus limited. Variant approaches are also proposed to use asynchronous computing to distribute computing load across different training epochs and queries using global causal graphs as a potential input signal into some of the machine learning models. Another variant approach utilizes an ensemble of models from which a best model is selected from the candidate models of the ensemble of models at the end of a training phase, selecting the model having the best fidelity relative to a validation set.

Figure 1:
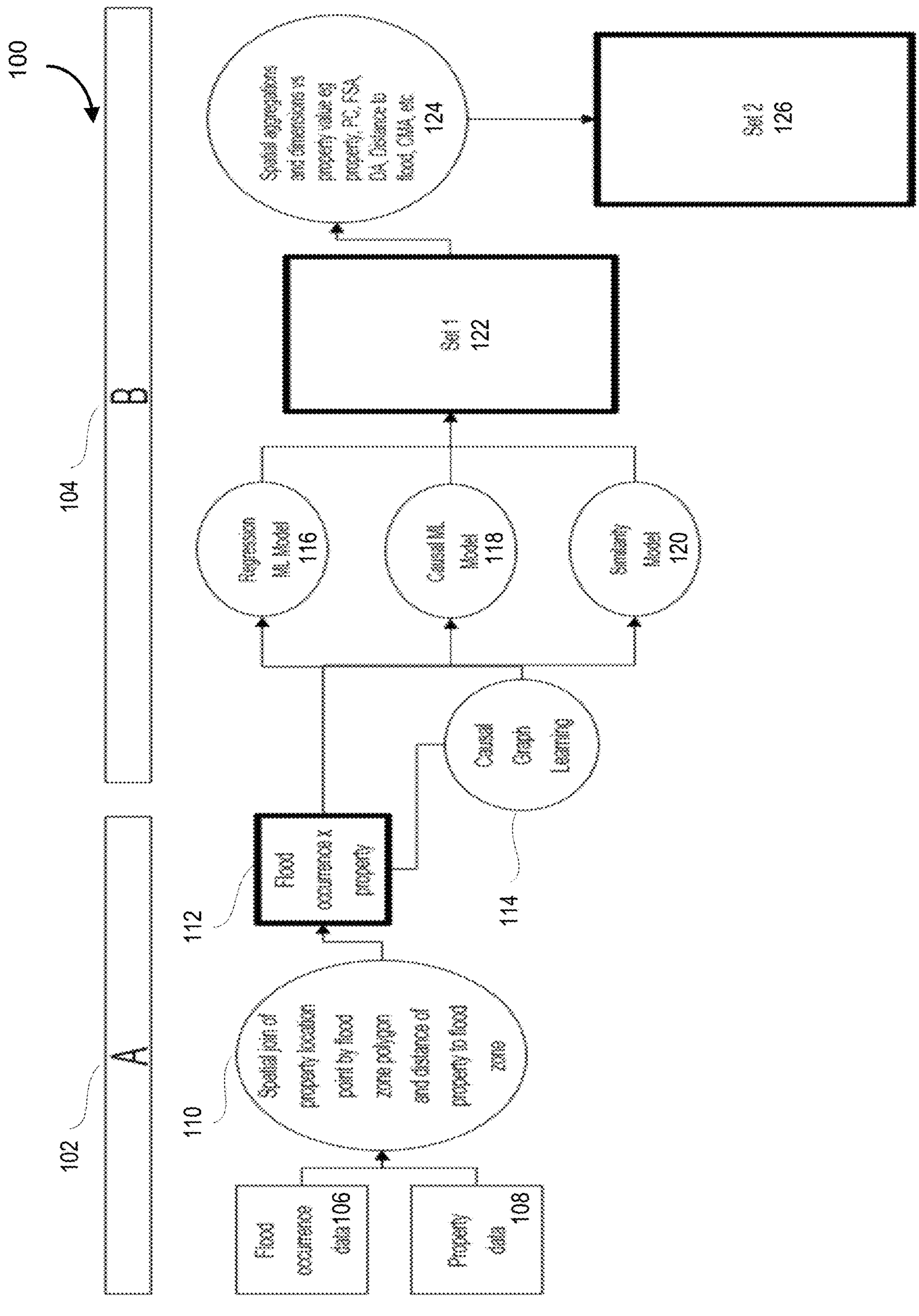
FIG. 1 is a block schematic diagram of an example system for providing a machine learning architecture for quantifying and monitoring event-based risk, according to some embodiments.

FIG. 1 is a block schematic diagram 100 of a machine learning architecture for quantifying and monitoring event-based risk, according to some embodiments. Raw inputs data sets are received and processed to generate aggregated input data sets for machine learning at section A 102, and the updating of the machine learning models and generating of predictive outputs is provided at section B 104.

In section A 102, the system 100 receives as inputs, a first input data set 106 of event occurrence data (e.g., flood occurrence data) and a second input data set 108 of a characteristic being monitored (e.g., property data). Both of the first input data set 106 and the second input data set 108 have geospatial characteristics, and in some embodiments, can include groups of data objects that are geospatially located, for example, based on a Euclidean or Cartesian coordinate system.

For example, raw input data relating to a flood risk can include data sets obtained from geospatial survey data, in the form of data objects or data tuples which are mapped, for example, to geospatial regions, such as polygons of geographical areas. These data can include, for example, flood return period datasets, Raw Depth Information (meters) in TIF of SHP format for all of a particular region, and can covers a variety of return periods for the following flood types: river floods, storm surges, surface water, coastal water, lakes and rivers, among others. In this data, the raw data can also be used to calculate derivative data that can be used as inputs (e.g., the 20 year return period files can be used to determine the following parameter: flood_r20 (true if property is in a 20 year return period flood zone, false otherwise). The polygonal shapes can be used to specify the boundaries of bodies of water, and for example, can be provided in SHP format and used to calculate the following parameters: distance_coastal_water (distance in meters to the nearest coastal water), and distance_lakes_and_rivers (distance in meters to the nearest lake or river).

Property data can be based on particular lots, concessions, zoning plans, etc., and can contain information such as price information, purchase price, appraisal date, location information, property latitude/longitude, distance from lakes or rivers, distance from coastal water, property type, property size, property age, physical risk, feature engineering, coordinate rotation, feature scaling, and the data can have a time-wise element such as being broken down to year and month.

The data objects may be spatially represented as locations having physical boundaries, and may be simplified into voxel type objects, such as polygonal shapes, among others, for ease of computation.

The data sets can include geospatial-based characteristics for every geospatial point. This information can be a tuple, such as GPS coordinates, altitude, underlying rock type, climate region, etc., and it is important to note that the underlying geography, characteristics, and geometry of physical features are important in assessing different types of risks. For example, geospatial points are related to one another through differences in elevations, slopes, etc., and there is a complex interrelationship in the underlying relationships relating to how impacts spread from a particular climate event. For example, in the event of heavy precipitation, lower-lying regions with poor draining (e.g., river beds, floor plains) are at great risk, areas with slopes have risk of landslide (or mudslide) towards lower-lying region, especially if the slope gradient is very high, etc. For bodies of water, the size and shape of the body of water can influence aspects such as fetch (increasing the size and ferocity of waves based on wind travelling a long distance over the water).

This can be represented, for example, through the geospatial data sets (e.g., altitude). Other information can also be observed and coded into the data, such as a type of underlying bedrock (which can affect draining), etc.

Another important aspect to consider is are the natural limitations of the geospatial data sets. While in the present day, there are certain data sets available, such as topographic maps and models in popular regions, this is not true in rural areas or underdeveloped regions. Finally, even if there are topographic maps and models available, they can be outdated or incorrect. Accordingly, there may be unobserved variables that may have significant influence. As described further in this application, some embodiments are directed to causal graph learning, which seeks to provide an additional signal using causal graphs in an attempt to latently model the additional unobserved variables. As the data sets may have a high amount of dimensionality, a further variation is to globally update the causal graphs for relationships between geospatial elements to reduce the overall computational load on the system by asynchronously distributing it as training is conducted for different research projects.

The first input data set 106 and the second input data set 108 do not necessarily need to utilize the same underlying schema for the geospatial characteristics (e.g., rainfall zones can be regular polygon based, while properties can be denoted more accurately through surveyed property boundaries, etc.

The first input data set 106 and the second input data set 108 are coupled together using a spatial join at 110 to create an aggregated input data set 112 (e.g., flood occurrence combined with property values or characteristics).

For example, a spatial join can include a spatial join of property location point by physical risk zone polygon and distance of property to flood zone and calculations of data such as a Flood_r20 (e.g., using a python module called rasterio, the system can open the 20 year return period flood TIF files from JBA), the latitude and longitude of the property location is used to extract the flood depth at that location, and depth information from the three different flood types can be used to determine whether or not the property is in a 20 year return period flood zone. Another calculation could include determining the distance_coastal-_water variable, which, for example, can be conducted using the modules geopandas, shapely, and scipy, and to find the closet distance between a property location and coastal water using a cKDTree algorithm could be used. In this example, a cKD tree is created from all vertices of the flood polygons and is queried for the distance and identity of the nearest neighbour. To calculate another variable, distance_lakes_and_rivers, a similar process to calculating distance_coastal_water can be used, but with a different set of flood polygons.

This aggregated input data set 112 is utilized as inputs into at least three different maintained machine learning models, including (i) a regression machine learning model 116, (ii) a causal machine learning model 118, and (iii) a similarity machine learning model 120. The aggregated input data set is also utilized for causal graph learning at 114, and the outputs from causal graph learning 114 are also provided into the (i) regression machine learning model 116, (ii) causal machine learning model 118, and (iii) similarity machine learning models 120.

In some embodiments, causal estimation is cached for future reuse, as these estimates may not change greatly over time. This saves time when running queries that have been executed previously. For example, a future model may seek to be trained or executed for a similar set of geospatial points, and this can cached causal graph can be used to bootstrap the process. This is especially useful in situations where a particular region is popular (e.g., New York City), and in some embodiments, the causal estimations and graphs are improved upon using available processing resources for each query, to the extent that there are additional processing resources, such that the aggregate of queries improves each subsequent query.

For example, each search in the region of New Orleans is utilized to improve the causal graph connecting events or spatial points for the set of points being queried (or proximate points thereof), such that over time, the causal graphs are built up over the aggregate of queries. As a further embodiment, earlier queries can be run again using future improved causal graphs to refine and re-tune outputs. The re-use and caching of a global causal graph is a useful approach to reduce overall processing estimations and can be particularly useful where a large volume of searches and queries are being conducted, if there are limited resources.

In some embodiments, coordinate rotation of latitude and longitude alongside representing date information using by month and year allows the models to pick up on different patterns that help establish causal relationships. This results in a more accurate estimate of causal effect. As the causal graphs are developed using prior training, in some embodiments, a wider ambit of trained causal graphs can be used for a given query campaign. For example, it may be useful to utilize causal graphs, if available, for a large catchment region to cover a wider range of potential environmental risks, which is important in longer-term planning or attempts to model for the impacts of less common phenomena (e.g., 1000-year volcanic eruption). The causal graph, from previous training, could, for example, latently identify the path lava could take in flowing down from the eruption and can be used as a signal for identifying the adjusted risk for properties that may be in the path, and a user of the system could then use this information to require enhanced seismic monitoring and alarm systems. The size and breadth of the causal graph being used as an input signal can be modified as a parameter for using the causal graph as a signal—for example, a large radius could be used for a model that is adapted to capture long-distance events, such as the eruption of a seamount near Indonesia causing a tsunami at different geographically distant shores across the world.

The outputs of the (i) regression machine learning model 116, (ii) causal machine learning model 118, and (iii) similarity machine learning models 120 are then combined together or undergo a selection process to obtain a first output data set 122, and the first output data set is then refined at 124 to generate the second output data set 126. Estimator selection between regression, causal ML, and similarity-based methodologies can be conducted using estimated stability generated for each estimator, and selection of estimators results in more accurate and robust estimates of causal effect. Refutation tests can be used to estimate stability and reliability of results and confidence intervals with all model methodologies, and estimating the stability of the causal effect allows the user to be confident that the outputs of the model are consistent. Joining discovery of causal relationships with automated model selection allows for faster analysis where the user is not required to manually create a causal graph.

The regression learning model 116, in the flood example, can be provided with a model structure that is adapted to fit a linear regression model for estimating the outcome (property price) using treatment T (flood) and confounders (W) and requiring a strong assumption of linear relationships between variables. A challenge with these approaches is that treatment (flood) is often highly correlated with confounders (W), which biases the estimation. In terms of supported outputs, the coefficient of the flood indicator in the fitted model can be established with log normalized data. In this example, the coefficient shows the percentage of price change when changing flood indicator from 0 (non-flood) to 1 (flood).

Figure 2:
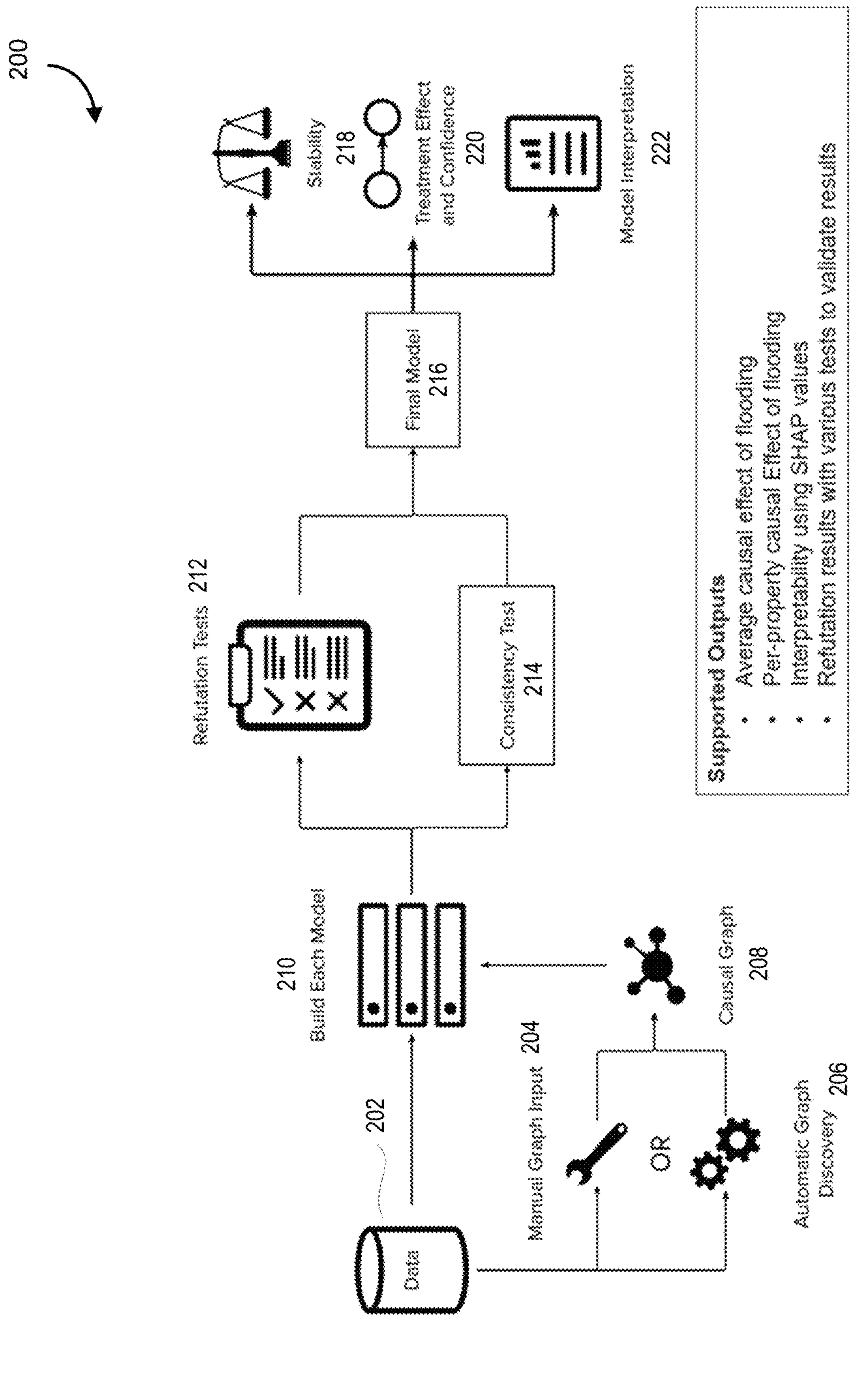
FIG. 2 is an example approach for validation of a causal machine learning model architecture, according to some embodiments.

The causal machine learning model 118 is shown in more detail at FIG. 2. FIG. 2 is a diagram 200 of an example approach for validation of a causal machine learning model architecture, according to some embodiments. The causal machine learning model 118 aims to make it possible to give robust, interpretable estimates of causal effect using a wide variety of estimation methodologies and tests. In terms of potential outputs, the causal machine learning model 118 may be configured to generate data values indicative of an average causal effect of flooding, a per-property causal effect of flooding, interpretability using SHAP values, and refutation results with various tests to validate results. An explanation of the causal model methodology is shown at FIG. 3.

Figure 4:
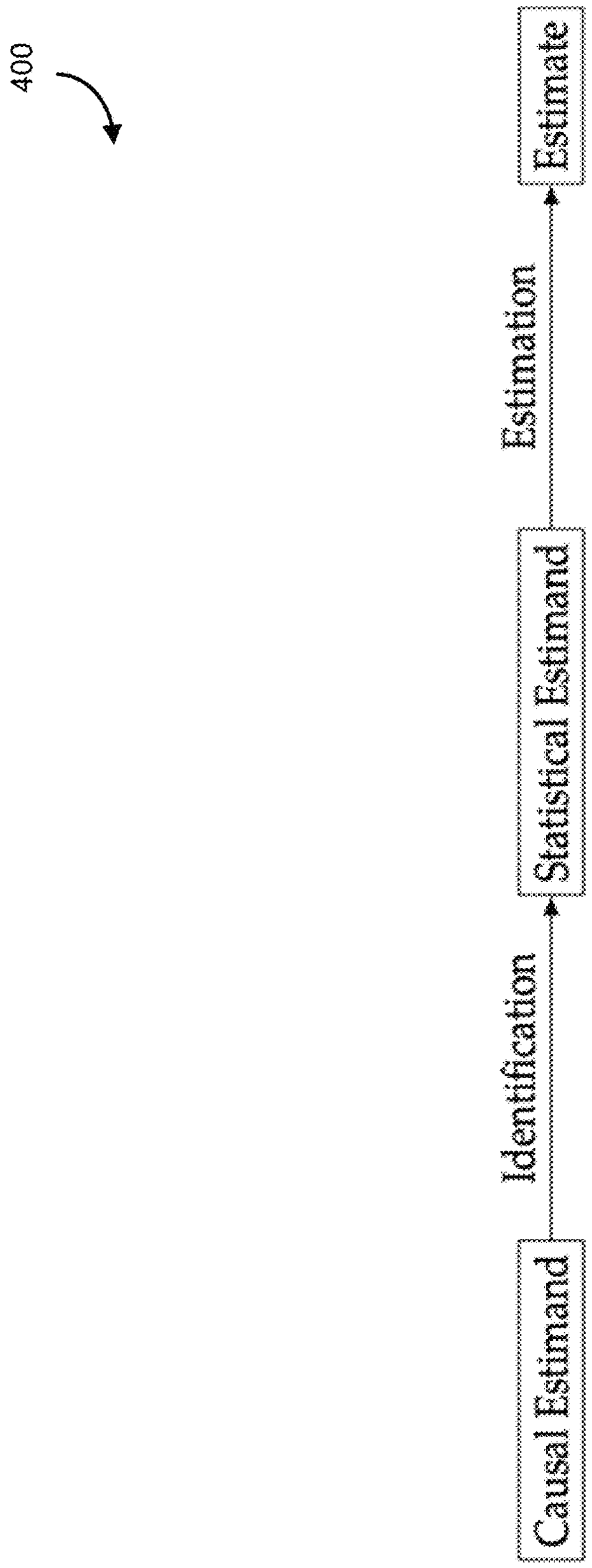
FIG. 4 is a process diagram, illustrative of an approach for causal machine learning, according to some embodiments.
Figure 5:
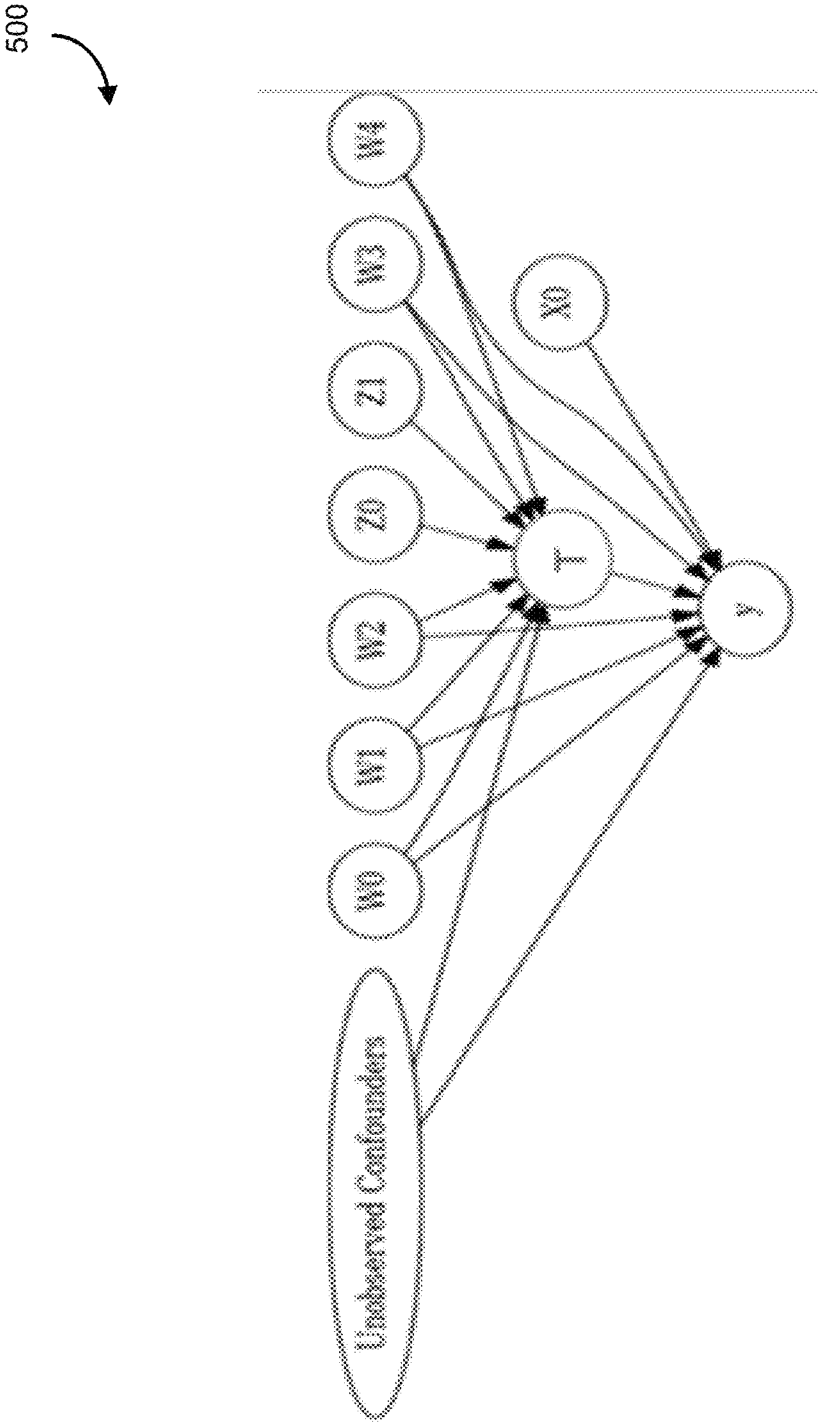
FIG. 5 is an example graph diagram showing an example causal graph, according to some embodiments.

Causal machine learning can be established using an estimation approach 400 shown in FIG. 4, maintain a causal graph 500 shown as an example in FIG. 5. Refutation tests and consistency tests can be used to seek to select the most stable and best performance model by comparing multiple causal inference models.

Figure 3:
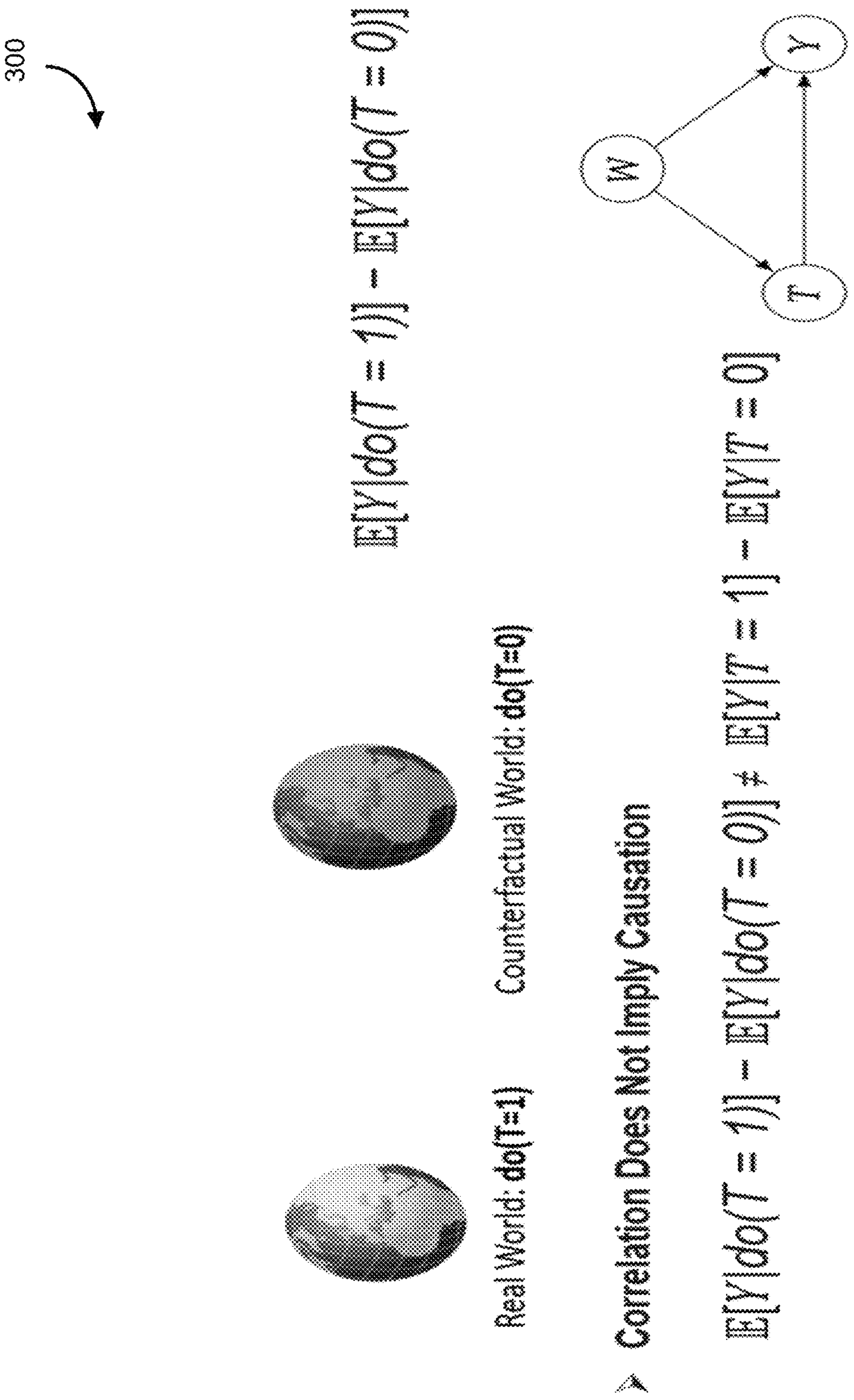
FIG. 3 is a methodology flowchart diagram showing an example approach for establishing causal effect using real world value determinations and counterfactual world value determinations, according to some embodiments.

In FIG. 3, diagram 300 shows an example approach for finding the causal effect of taking an action T on an outcome Y, and the causal effect is defined by the difference between Y values attained in the real world versus the counterfactual world. It is important to note that correlation does not imply causation. As explained in FIG. 3, correlation does not imply causation—for a random experiment: randomization may imply covariate balance, and covariate balance may implies that association is causation.

Steps of causal machine learning can include:

Modeling to provide directional causal relationship between the variables that can be represented as a graph (can be manually selected, or automatically selected based on the data given). In this example, confounders (W) are defined factors that simultaneously has a direct effect on the treatment decision in the collected data and the observed outcome, and instrumental variables (Z) are defined as a subset of the controls with respect to which we want to measure treatment effect heterogeneity (X).

Identification to check whether the target quantity can be estimated given the observed variables and change the casual estimand to a statistical estimand.

Backdoor identification: E[Y|do(T=t)]=EWE[Y|T=t, W=w]

Condition: all common causes of the action T and the outcome Y are observed

Causal effect can be identified by conditioning on all the common causes.

Instrumental variable (IV) identification: E[Y|do(T=t)]=EWE[Y|T=t,W=w]

Condition: there is an instrumental variable available, then we can estimate effect even when any (or none) of the common causes of action and outcome are unobserved.

Estimation: building a statistical or machine learning estimator that can compute the target estimand identified in the previous step and use the estimator to evaluate the causal impact.

Refutation: includes refutation tests that seek to refute the correctness of an obtained estimate using properties of a good estimator.

Two methodologies of causal inference models for estimation are proposed for use: Orthogonal/Double Machine Learning (DML), and Doubly Robust Learning (DRL), where there is an assumption that all potential confounders/controls (factors that simultaneously has a direct effect on the treatment decision in the collected data and the observed outcome) are observed.

Other approaches for estimation can include, for example, Grouped Conditional Outcome Modeling (GCOM), Increasing Data Efficiency (TARNet, X-Learner), Propensity Scores, Inverse Probability Weighting (IPVV), Matching, Causal Trees and Forests, among others.

Orthogonal/Double Machine Learning (DML) can be used for predicting the outcome from the controls or predicting the treatment from the controls using the relations:

$$\tilde{Y}=Y-q(X,W)$$

$$\tilde{T}=T-f(X,W)=\eta;$$

and then fit to the final regression problem using the relation:

$$\tilde{Y}=\theta(X)\cdot\tilde{T}+\varepsilon.$$

Steps for DML can include:

Step 1: Randomly partition the data into K subsets (k=1, 2, . . . , K)

Step 2: Fit Machine Learning models

Model "T": Fit treatment model from control variables $\tilde{T}$=T−f(x,w)

Model "Y": Fit the outcome model from control variables $\tilde{Y}$=Y−q(x, w)

Final Model: Fit the final model to get the treatment effect θ based on the sub dataset k $\tilde{Y}=\theta(x)\tilde{T}-\varepsilon$ Step 3: Summarize the treatment effect θt(X) from each subset k to get the final treatment effect and confidence internal.

Doubly Robust Learning (DRL) can be used to learn a regression model ĝt(X,W), by running a regression of Y on T,X,W, learn propensity model p̂t(X,W), by running a classification to predict T from X,W, or construct the doubly robust random variables using the relation:

$$Y_{i,t}^{DR} = g_t(X_i, W_i) + \frac{Y_i - g_t(X_i, W_i)}{p_t(X_i, W_i)} \cdot 1\{T_i = t\};$$

and learn θt(X) by regressing $$Y_{i,t}^{DR} - Y_{i,0}^{DR} \text{ on } X_i.$$

A potential advantage for DRL is that the mean squared error of the final estimate θt(X), is only affected by the product of the mean squared errors of the regression estimate ĝt(X,W) and the propensity estimate p̂t(X,W). Thus as long as one of them is accurate then the final model is correct.

Steps for DRL can include:

Step 1: Randomly partition the data into K subsets (k=1, 2, . . . , K)

Step 2: Fit Machine Learning models

Fit a regression model by running a regression on Y from treatment T and control variables X and W:

$$\hat{Y}=\widehat{gt}(x,w)$$

Fit a propensity model by running a classification model on treatment T from control variables X and W:

$$\hat{T}=\widehat{pt}(x,w)$$

Calculate the doubly robust estimates $$Y_{i,t}^{DR} = g_t(x_i, w_i) + \frac{Y_i - g_t(x_i, w_i)}{p_t(x_i, w_i)} \cdot 1\{T_i = t\}$$

Fit regression model by running $$Y_{i,t}^{DR} - Y_{i,0}^{DR} = \theta_t(x_i)$$

Step 3: Summarize the treatment effect θt(X) from each subset k to get the final treatment effect and confidence interval.

ML models in step 2: The following ML methods can be applied for training, and the best model is selected: Random Forest, XGBoost, Neural Network.

Figure 6:
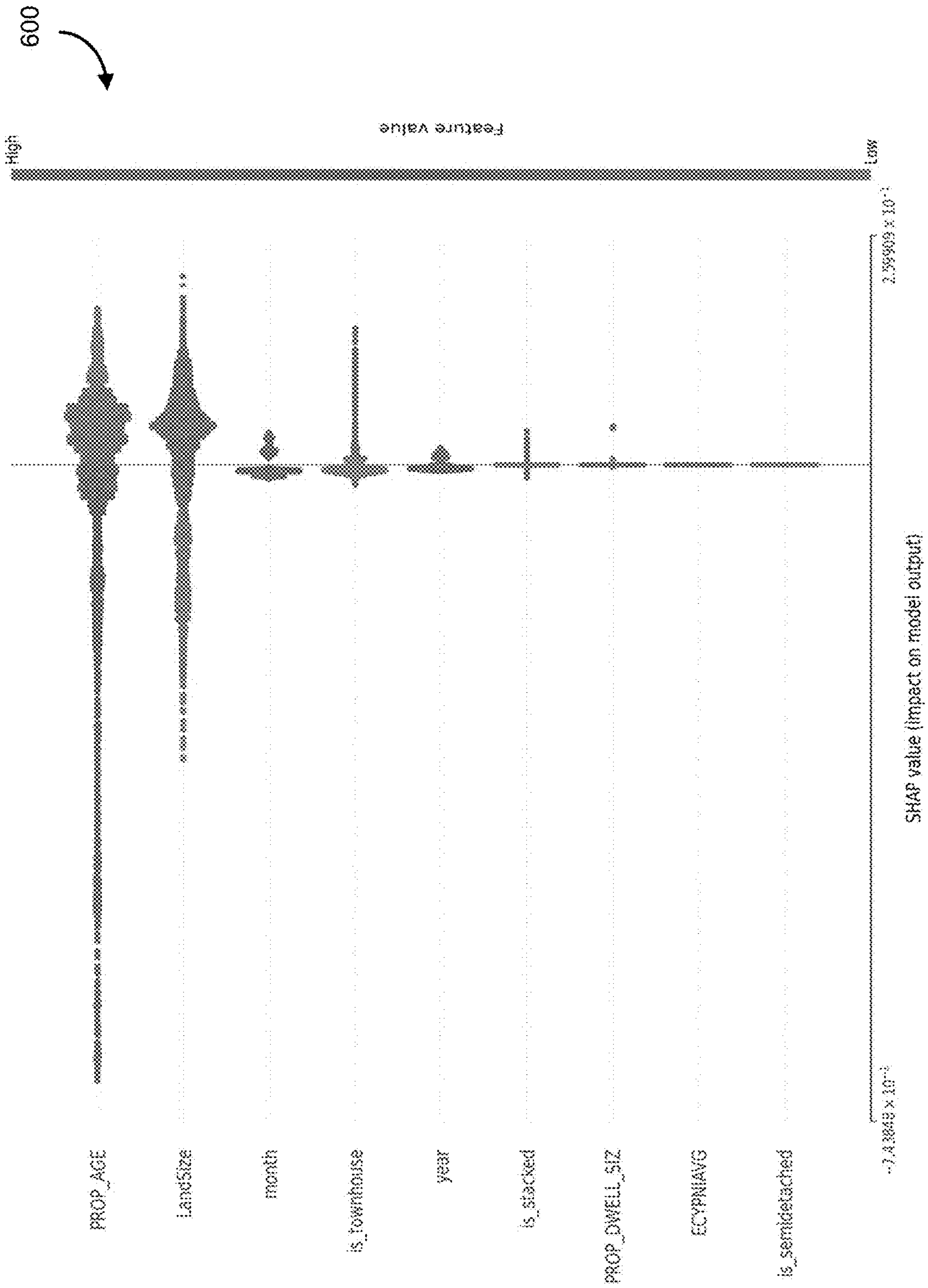
FIG. 6 is an example graph showing feature value against property characteristics, according to some embodiments.

ForestDML is one of the best methodologies among the other causal methodologies for this case based on performance. This methodology has the DML architecture. The chosen model structure for each step is as follows:
Model "T": GradientBoostingClassifier
Model "Y": GradientBoostingRegressor
Final Model: Generalized Random Forest Causal model explainability: Machine leaning model is complex. It is important to add explanation to ensure the selected model is optimized for the target objective. FIG. 6 is a diagram 600 showing an example of model explanation method using SHAP values. The approach is adapted for interpretability by methodology whereby causal ML models can be used to provide the importance of the effect of each feature and the direction of the relationship between features and the purchase price. In some embodiments, the system provides an estimator selection engine that is configured to provide estimator selection capabilities between regression, causal ML, and similarity-based methodologies using estimated stability of each estimator. Selection of estimators results in more accurate and robust estimates. The system can also be configured to estimate stability and reliability of results using refutation tests and confidence intervals with all methodologies. Estimating the stability of the models allows the user to be confident that the outputs of the model are consistent.

Causal ML Models—SHAP Values describe the effect of each feature on the purchase price for every examined property.

Regression Model—Coefficients describe the direction of the relationship between features and the purchase price. When features are scaled, they describe the standardized effect of each feature.

For similarity modelling, an approach can be used as follows:

For each property ($x_i$) in high risk zone:

1. Determine the average price difference between the property and its most similar properties in the low risk zone $$s_i^{nf} = \frac{1}{k}\sum_k \left(P_{x_{ki}^{nf}} - P_{x_i}\right)$$

2. Determine the average price difference between the property and its most similar properties in the high risk zone $$s_i^{f} = \frac{1}{k}\sum_k \left(P_{x_{ki}^{f}} - P_{x_i}\right)$$

3. Obtain the difference between 1 and 2

$$S_i = s_i^f - s_i^{nf}$$

For step 1 and 2, similar properties are found using K nearest neighbor algorithm (An algorithm that calculates the similarity value based on the similarity between the features/attributes of properties).

For step 1 and 2, the similar properties found for a given property which similarity to the given property is less than a certain threshold are dropped and not considered in the calculations.

The outputs for the similarity modelling can include, for example, returning the values from step 3 for each property and visualize it on the map, or showing the median of values from step 3 per FSA on the map.

For the similarity analysis, when calculating the similarity between the properties, the weights for the features can be set based on the feature importance obtained by a regression model trained to predict property value (as assigning different weights to features allows for more precise estimates of similarity to obtain more precise final estimates of effects), and furthermore, the approach can include defining the optimum K (the number of similar properties to be found for each property using the K-nearest neighbor algorithm, which can effect precision if a suboptimal value is used) as well as estimation of the statistical stability of the results, which can be used to establish numerical estimates of the stability of the results.

In other embodiments, other approaches can be used for estimation, including but not limited to, Grouped Conditional Outcome Modeling (GCOM), Increasing Data Efficiency (TARNet, X-Learner), Propensity Scores, Inverse Probability Weighting (IPW), Matching, Causal Trees and Forests, among others.

A reusable and scalable python toolkit can be developed to automate the evaluation process and automatically generate the evaluation metrics. This toolkit will not be limited to this use case. It can be used for various use cases with this approach, among other embodiments.

The first output data set 122 can be utilized, for example, for analyses including, determinations of whether property is at risk of event occurrence (e.g., flood), whether asset characteristics (e.g., property value) considers event occurrence, and quantifications of price differential for asset given event occurrence risk, asset characteristics given event occurrence risk, value differential of asset characteristics when in multiple event occurrence zones, and changes in effect of event occurrence on asset characteristics over time. The first output data set 122 can also be utilized to generate estimates that consider various event occurrence return periods (e.g., 20, 50, 100, 200, 500, 1500 years). The approach is utilized to determine whether a property has a high physical risk, and then to investigate whether the property price is risk adjusted (e.g., does the property price consider physical risk).

In some embodiments, a rough estimation can be first utilized such that, in the flood example, for a given property in high risk area, the conditional causal effect of risk is estimated (using causal ML). If this value is meaningfully negative, it means that risk is probably considered in the price. Results pertaining to groups of properties are more reliable than for individual properties.

Following the rough estimation, a granular estimation can be utilized where, in the flood example, for a given property in high risk area, the individual treatment effect is calculated as the difference between the original price and the estimated counterfactual value of price (price changing the high risk indicator to False). If this value is meaningfully negative, the risk has been considered. Quantifies property value given risk value.

The true property value is then estimated, for example by estimating causal effect of risk on purchase price where physical risk is known to the buying population, then for the property in question, find the difference between the "true" causal effect of physical risk calculated above and the individual causal effect for the property, and then of the property has high physical risk, add the above difference to the purchase price. An adjusted price can thus be established. The estimates can be established to consider all physical risk return periods (e.g., 20, 50, 100, 200, 500, 1500) and differences among return periods calculated.

A value differential of property value can be quantified when in multiple physical risk zones, and a risk indicator is a discrete/categorical variable in this case (number of high risk zones). For the ML approach, most of the estimation mythologies can work for discrete/categorical treatment types. Changes in effect of risk can be quantified on property value over time by calculating differences over time and model trend, indicating significance, magnitude and direction of trend.

In the generation of Set 1, the estimator selection for optimal effect can also occur by attempting to refute results with various tests and also run consistency test to validate results and find the optimal estimator.

The second output data set 124 (Set 2) can be utilized for establishing spatial aggregations and dimensions compared against asset characteristic (e.g., property value), such as (property, PC, FSA, DA, Distance to flood, CMA, etc.) of the first output data set 122 (Set 1). The aggregations for example, can be established by having the data grouped by: union aggregate or other tabular or spatial operations to create meaningful representations of risk by location. For example, individual property information can be aggregated to the census metropolitan area (CMA), allowing comparison of physical risk awareness by CMA to inform management and policy strategy (e.g., targeted awareness campaigns).

The approaches described herein are useful to provide computer aided outputs that support physical risk assessments input to risk management plans. In the flood/water example, the data outputs can be utilized to improve an understanding of whether property price considers physical risk is critical to risk management, whereby the quantification of a risk event for a given asset allows more targeted management. For example, assets at high risk of flood can be the focus of adaptation measures such flood proofing, drainage improvement, pumping systems, water storage and conveyance, etc.

The machine learning approach described herein can be utilized to generate estimates where the risk of an event is over or under estimated as perceived by the market (e.g., through property value), allowing a different method of risk management. For example, such an understanding allows the identification of areas of low risk awareness. Areas with low risk awareness, but high risk, would be ideal targets for management intervention by for example, flood awareness campaigns.

Furthermore, the system can also be configured to cache results of model estimation for future reuse. This saves time when running queries that have been executed previously, and to allow for coordinate rotation of latitude and longitude alongside representing date information using by month and year to allow for the models to pick up on different patterns that help establish model. This results in a more accurate estimate Understanding the spectrum of risk and awareness across event return periods provides more targeted management opportunities as above. This also allows the continued and more effective management of the above as climate change shifts the likelihood of occurrence of physical risk events. So, for example, a property that was in the 50 year return period would have an expected effect on property value. Because the system estimates the effect on property value for other return periods, when that 50 year return period flood zone becomes a 20 year return period flood zones (or when one wants to plan for that climate scenario), the system can still have an estimate for the effect on property value. So, management activities can target current and future risk given climate change.

Tracking the risk and perceived risk of an event over time allows the measurement of the effectiveness of management activities. For example, over time, this would allow the tracking of property values was they approach the true value with respect to the risk of a given event. The selector/optimizer function allows for an estimate of the above for a given asset, improving accuracy of management targeting.

Aggregating the above estimates spatially, for example by postal code, dissemination area, risk density regions, enables regional (instead of individual) identification of risk zones and targeting of management activities, which is particularly relevant to affecting market perceptions. For example, the awareness of a whole town of flood risk would affect property values more than if that awareness was isolated to one buyer or seller.

The market perception/awareness of flood can be much different from actual risk of flood. So risk management can be targeted much more efficiently when targeting high risk, low awareness assets/regions, than simple targeting high risk assets/regions since those regions may already be aware. Understanding perceived awareness is very difficult and the proposed approaches are useful for creating an opportunity in an area that is not well understood.

Organizations such as financial institutions can use the methods for risk management. For example, a key metric in credit risk is loan:value, where high ratios are considered more risky. Mortgage portfolios can be assessed using the methods described herein to identify the effect of an event on value (and LTV) in the portfolio, how that may change by event severity and in climate change scenarios. Moreover, the value differential caused by market perception can also be identified, and managed accordingly.

Corresponding systems, methods, and non-transitory computer readable media storing machine interpretable instructions are contemplated.

Figure 7:
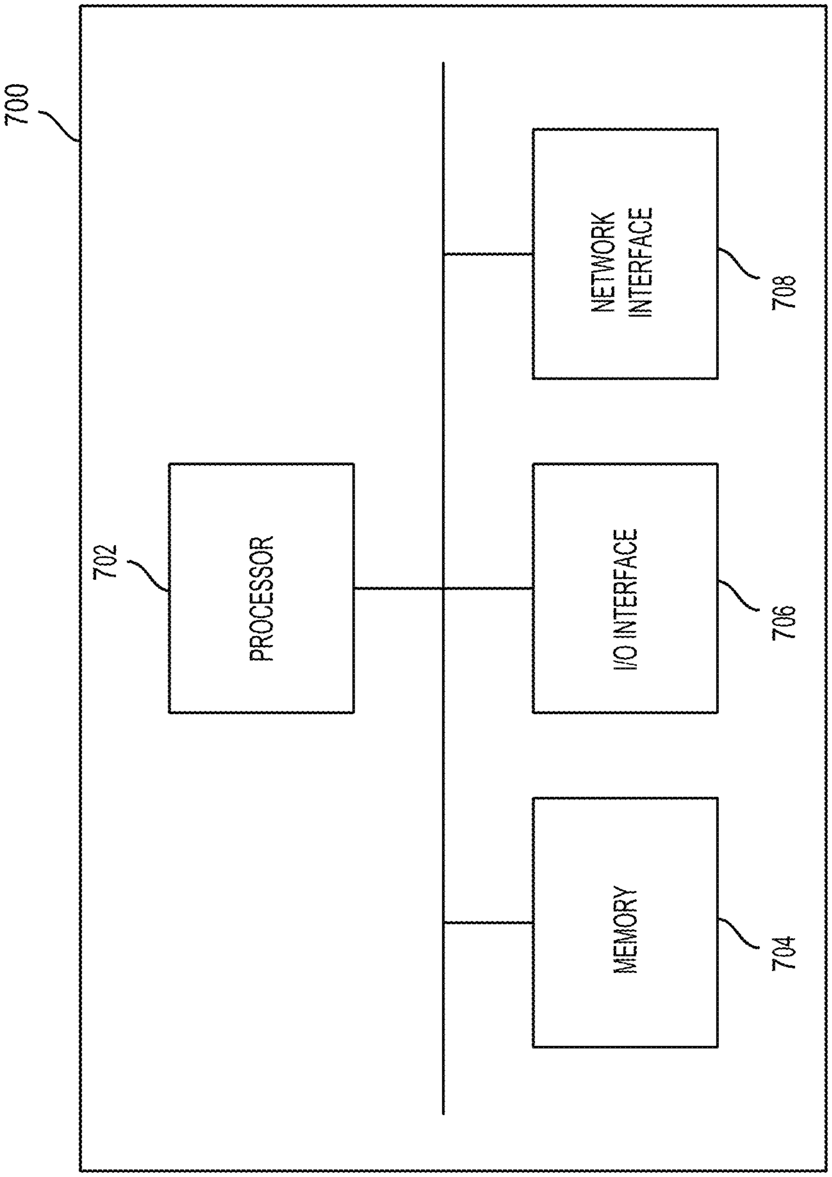
FIG. 7 is a block schematic of an example computing device, according to some embodiments.

FIG. 7 is a block schematic of an example computing device 700 having a computer processor 702 operating in conjunction with computer memory 704, an input/output interface 706, and a network interface 708, according to some embodiments. The computing device 700 is a server that is configured to conducting machine learning, and stores inputs and models in computer memory 704. Causal graphs generated by the approach are also stored and maintained in computer memory 704. As new training data is received by the server 700, it may be processed and used to refine the models stored in computer memory 704. In some embodiments, for efficiency of storage, after the training data is processed, it may be discarded or otherwise not saved onto the computer memory 704. After a training period (e.g., to reduce an overall error in view of historical training sets with ground truth information), the trained models can be used for inference, and deployed for use with new input data to generate predictive outputs.

These predictive outputs, for example, can be run against a property database where geospatial data (e.g., coordinates and characteristics of physical features, such as slopes, drainage basins, elevation, altitude, rainfall/lack of rainfall), can be combined with property values and assessed to determine, for example, whether certain properties are over-valued, under-valued, given different types of risks being assessed (1, 5, 10, 100, 1000 year risks) and their associated impacts (e.g., minor damage, major damage, catastrophic damage).

In some embodiments, server 700 is provided in the form of a special purpose computing device, such as a rack mounted server appliance coupled to a message bus, which receives input data sets from upstream computing devices for training and/or inference, and generates output data sets for provisioning onto the message bus for consumption by downstream computing devices, such as insurance premium/adjustment determination subsystems, automatic transaction subsystems (e.g., to automatically buy or sell assets which are beyond a particular threshold for overvaluation/undervaluation).

Figure 8:
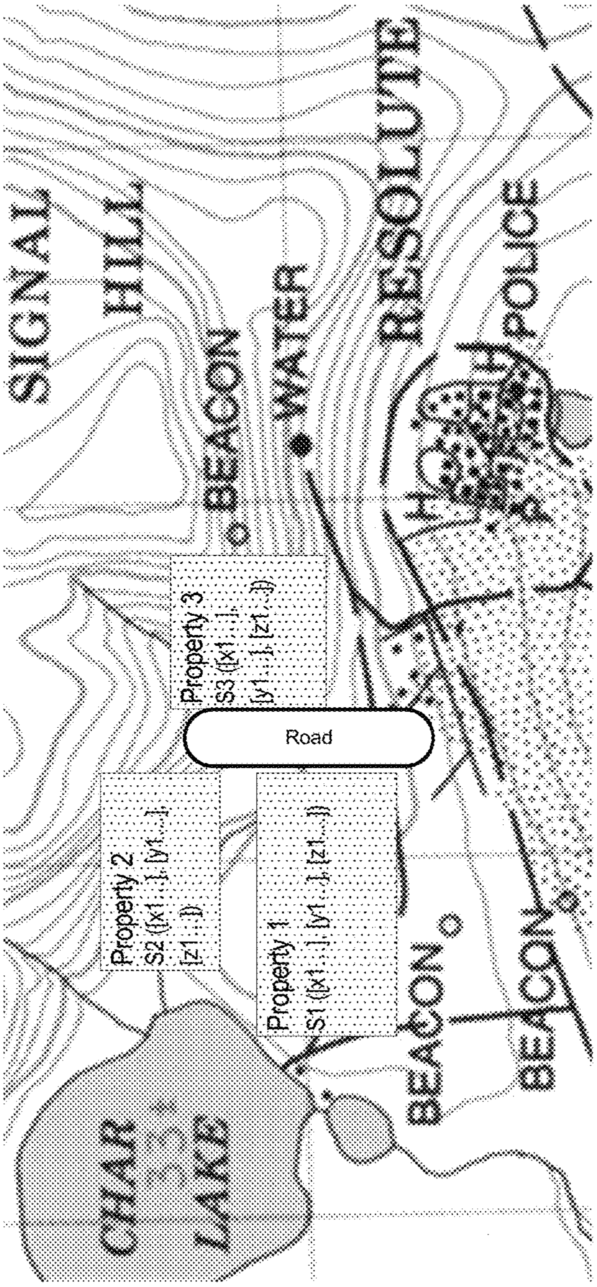
FIGS. 8, 9, 10, 11, 12, 13 are an example illustrative topographic map having an overlay for three example properties, represented as simplified polygons, according to some embodiments.

FIG. 8 is an example annotated topographic map 800 showing a region having specific geospatial properties, in relation to three simulated properties, according to some embodiments. In FIG. 8, the three properties, Properties 1, 2, and 3, each have a set of geospatial coordinates that define the boundaries of their properties. These geospatial coordinates can, in some embodiments, be coupled with other information about the property, such as build quality, age of build, which building code is being followed, siding type, building slope, among others, and this building information can either be established for the entire property (e.g., property 1 is a class 4 building, and all points in the set of points for property 1 are assigned a class 4 rating), or more granularly—certain points in property 1 have stronger build quality than others, such as a main building as opposed to an extension for a car garage built onto the house, unimproved regions of property 1, etc. In the granular example, each point itself can be associated with different building information.

While the Properties 1, 2, and 3 in FIG. 8 are shown as rectangles, other types of shapes can be utilized, and these can be obtained, for example, based on geospatial surveys, land survey information, etc., denoting the size and shapes of each of the lots. In this example, all three of the properties are in the same zip-code region.

Accordingly, for each of the properties, they can be converted into a computational representation of data tuples for each geospatial point that falls within the polygon. In a simpler example (e.g., to reduce computational requirements), each of the buildings can instead be represented by a point established by a centroid of a polygon.

Figure 9:
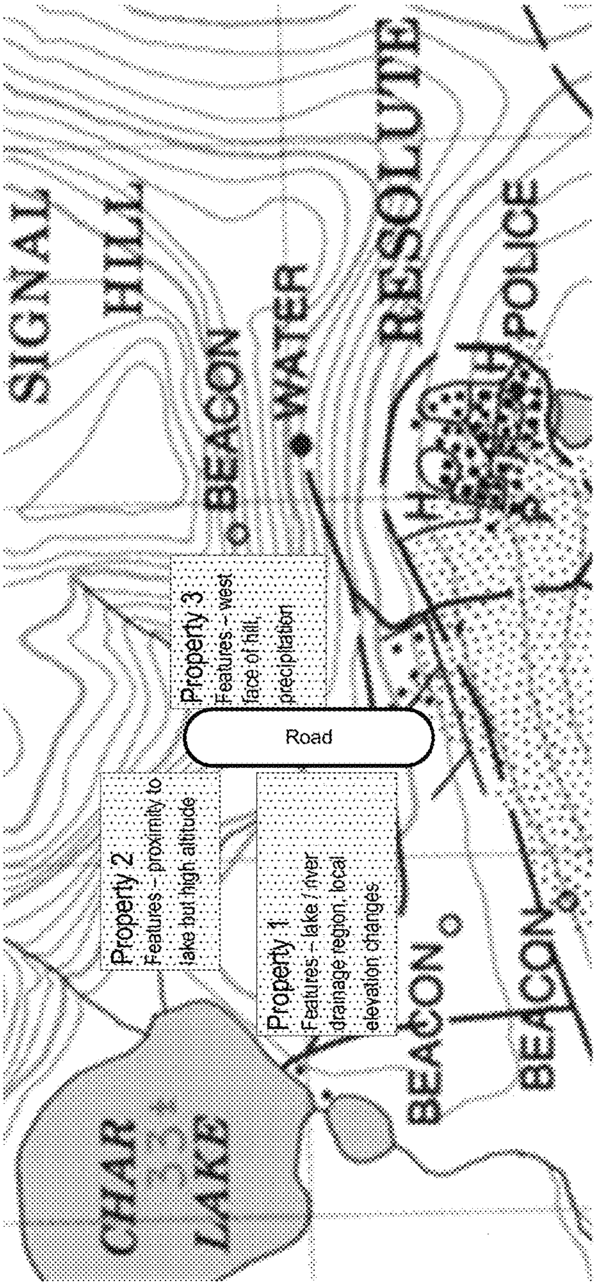

In the illustration 900 in FIG. 9, for each of these geospatial points, additional features can be determined based on proximate geospatial information, or other information, such as historical precipitation for a particular region or point, draining information, etc., and each of the geospatial points can thus be extended to include, for example, representations related to distance from coastal water, distance from lakes and/or rivers, proximate changes in elevation, etc. For example, a point (x, y, z), can be then extended to include a distance_coastal_water of 0.3, a distance_lakes_and_rivers of 0.4, etc., such that the tuple becomes a set of 5 data elements. From a machine learning/computational perspective, an increased number of data elements aids in providing increased granularity to the analysis, while also requiring more complex computation.

Figure 10:
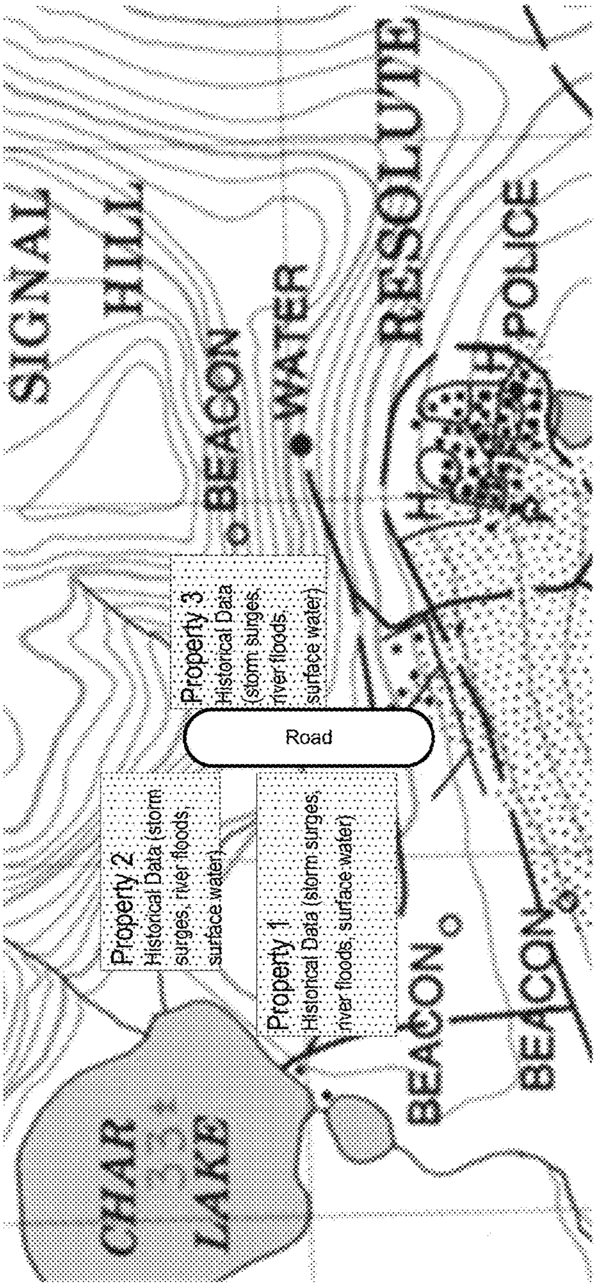

In the illustration 1000 in FIG. 10, historical data can also be obtained in respect of each of the geospatial points in each set for each property, or in some embodiments, based on proximate geospatial points as well. This data can be utilized to track different durations of time into the past, such as 5, 10, 100, 1000 years.

During the training of a system 700, historical data can be used as an input training set to refine one or more models for generating predictive outputs, with the objective of reducing an overall error term, such as a probability and/or impact of different types of damage events. During inference, after training, the trained models can instead be utilized to generate an example set of risk profiles based on the different geospatial point sets representing each of the properties. When calculating the similarity between the properties, the weights for the features are set can be based on the feature importance obtained by a regression model trained to predict property value.

Multiple machine learning models can be used simultaneously so that refutation tests and consistency tests can be utilized to validate results and to identify an optimal estimator machine learning function or a combination thereof. Different models, for example, can be used to identify optimum parameters, such as K (the number of similar properties to be found for each property using the K-nearest neighbor algorithm), or estimate statistical stability of the results.

As a non-limiting example, K=4, K=45, K=6, and so on, could be utilized as different models that are all trained using a K-nearest neighbor algorithm, and an optimal model can be selected through nearness to ground truth for a validation set, or how consistent/grouped various model outputs are to one another (e.g., if the ground truth is not available). To determine a final causal effect estimation to use, a methodology can be selected as a representative. The estimate of the representative is used as the final causal effect estimation.

To select a representative, the following can be determined for each methodology:

Estimate causal effect of treatment on outcome

Estimate confidence interval

Apply DoWhy refutation tests to each model

Score model methodology based on performance on refutation tests and confidence interval The model methodology with the best score can be selected as the representative.

Figure 11:
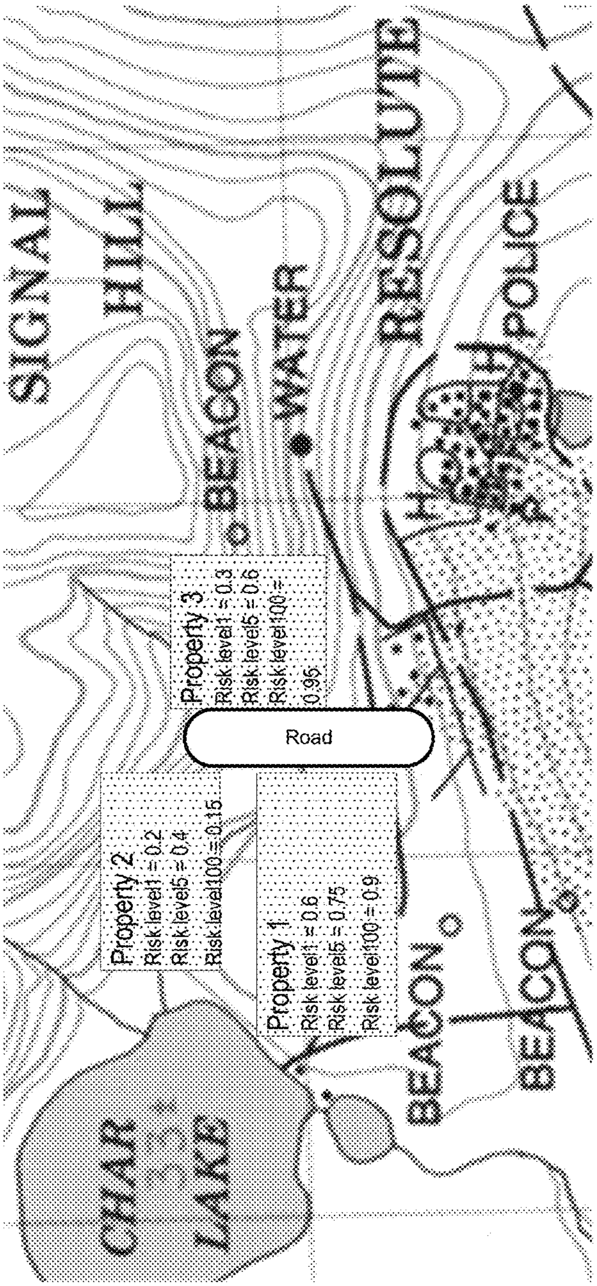

For example, as shown in the illustration 1100 of FIG. 11, each of the properties and their corresponding tuples are provided into the machine learning models, and the machine learning models have yielded different physical risk levels for 1, 5, and 100 year risk profiles, which, in some embodiments, are not only based on probabilities, but also adjusted based on impact. As noted above, different rough/granular approaches can be used to reduce an overall required processing effort required. In this example, in FIG. 11, while both properties 2 and 3 are relatively higher than property 1 and thus have less chances of being flooded on a regular year, property 2 may have gentler sloping elevation features that reduce the overall impact of a calamitous flood (e.g., a “100 year” flood). Property 3, for example, while the 1 year risk level is also similarly small, the 100 year risk level can be significant due to a potential for a catastrophic landslide.

If a one-size fits all approach based on zip-code region is applied, Properties 1, 2, and 3 cannot be distinguished, and they may all be applied the same risk rating for corresponding analyses. The risk rating may then be grossly unfair to Property 2, which, as a result of the unfairness, may be uninsurable or suffer a poor valuation despite actually having a reasonable risk level. This output, for example, could be Set 1 122 as provided in FIG. 1.

The machine learning model approach as proposed herein can be useful to mitigate this unfairness by applying machine learning to provide a more granular, spatial assessment of the geographical features and their corresponding characteristics to provide a useful output.

Figure 12:
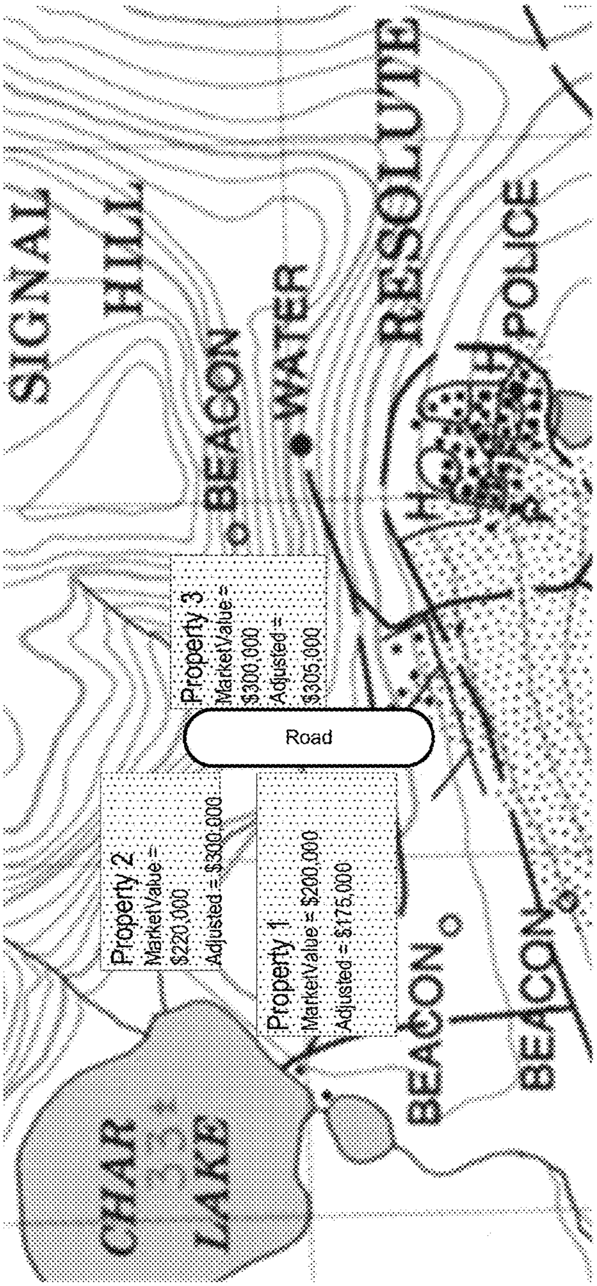
Figure 13:
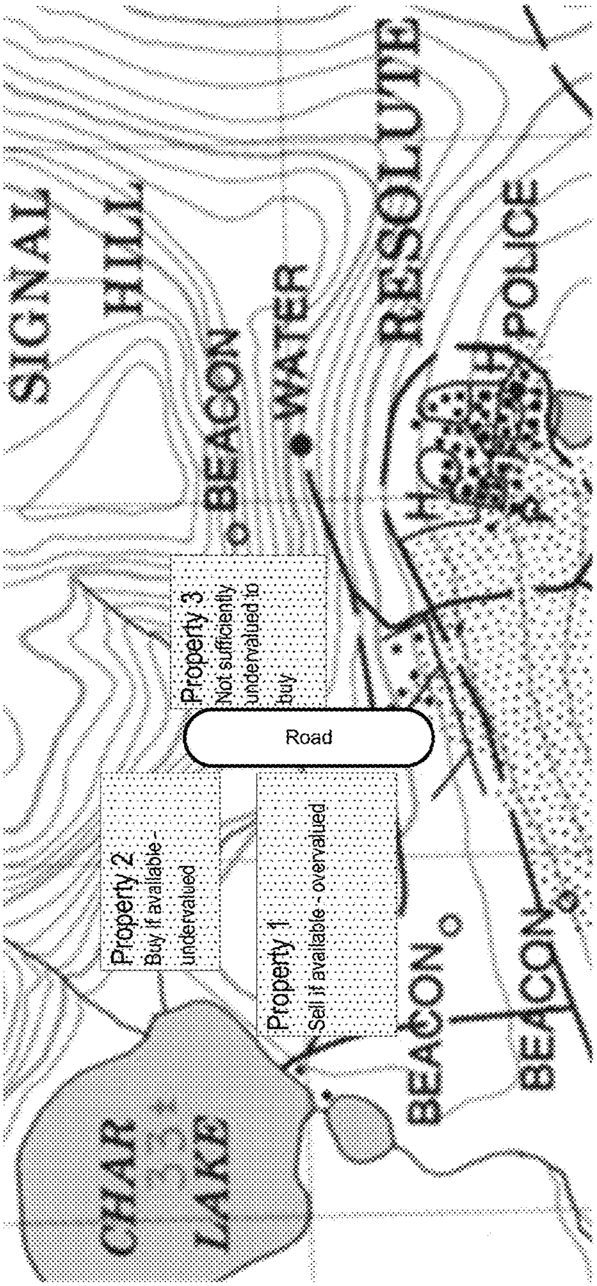

In illustration 1200 of FIG. 12, for example, the data can then be combined with market data to generate a machine learning output data set that, for example, is an adjusted market value using an adjustment factor, for example, aggregated across all of the spatial points comprising a set of points for each of the properties. These projections and estimates can be vastly different than the current market values, and these can be utilized, for example, by a downstream computing system, as shown in the illustration 1300 of FIG. 13, to generate control instructions to initiate data processes to buy a particular property, sell a particular property, or do nothing, depending on an estimated amount of overvaluation, undervaluation, etc.

Other potential use cases include granularly setting interest rates reflective of machine learning-based risk analyses (e.g., Property 1 has a interest rate of 5.6%, while Property 2 would have an interest rate of 4.55%), setting insurance premiums, etc. The system can be utilized to rectify inherent unfairness in prior approaches, such as a zip-code based model, where potentially all of properties 1, 2, and 3 would have been uninsurable for example (although only properties 1 and 3 had risks according to the machine learning models). The risk outputs of the system can be utilized, for example, to assess whether the "true" causal effect of physical risk has been considered or taken into effect by a market (e.g., the buyer population).

In some embodiments, the system can also be utilized by a decision support system to steer or deter a potential buyer away from a particular purchase of a property, or request, for example, if construction is being made, that a higher level of building code is required (e.g., requiring hurricane-resistant siding, storm shelters, screws) as a condition for financing. The level of building code or improvement can also be based at least on the machine learning outputs, and the comparison of physical risk awareness can be used to inform management or policy strategies to establish, for example, targeted awareness campaigns, among others.

An example set of simulated data 1400 is shown in FIG. 14. In FIG. 14, "flood" and "price" is the treatment and outcome, respectively. "distance_lakes_and_rivers", "distance_costal_water", "property_age", "average_income", "is_detached" and "size" are the control variables. At first, for each of the control variables a distribution function is fitted to the real data. Secondly, the simulated data for the control variables is generated by random sampling of the fitted distribution functions. The simulated treatment effect and outcome are generated using the models shown in FIG. 14.

Multiple sets of simulated data is generated using the model of FIG. 14, and by setting the value of the "treatment effect" parameter to different constant values: [−500, −1000, −4000, −8000, −16000].

The treatment effect is estimated using the benchmark method OLS as well as a proposed causality tool, according to some embodiments. The estimation has been run for 20 times. The aggregated results (mean and standard deviation) of all the runs are shown in the below table. As the results shown in the table 1500 of FIG. 15 show, causality method outperforms OLS (linear model) for all of the 'treatment_effect" values and provides estimations closer to the true values. Advantages over benchmark linear regression model (Ordinary Least Square) can be noted as Ordinary Least Square (OLS) will not work if:

1. The effect of the variables X, and Won the outcome Y is not linear.
2. OLS approach would not provide treatment effect heterogeneity (individual treatment effect)
3. The number of control variables X, W is large and comparable to the number of samples (This doesn't apply to the current case if the approach does not have so many control variables).

Figure 16:
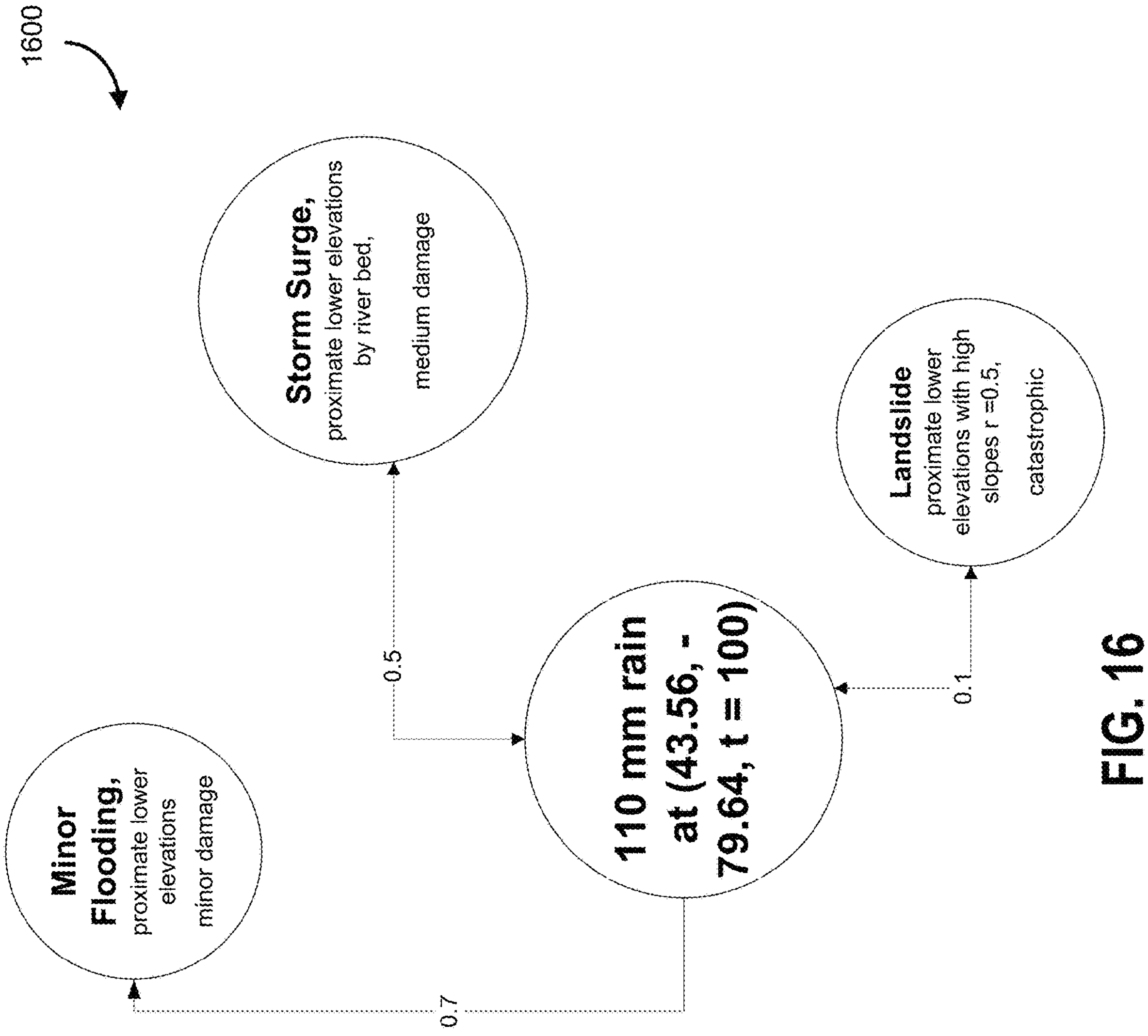
FIGS. 16, 17, 18 are example causal graphs having interconnected weights that are trained alongside the models during the training phase, according to some embodiments.

FIG. 16 is an example causal graph 1600 that can be generated, and tuned, during the machine learning training process, according to some embodiments. There are different variations of causal graphs that can be utilized. In this example causal graph, an estimated event at a particular point can be coupled with other types of related events and their probabilities, using weighted interconnections that can be defined by tunable weight factors. In this example, each nodal point can represent a type of event, and the interconnections can be utilized to generate a strength of relationship as between causality of the different types of events. For example, rain of a particular precipitation amount may potentially cause minor damage from minor flooding where storm drains are overrun, medium damage where there is a full storm surge, or a catastrophic landslide.

Each of these events can be linked together and associated with radii or other types of characteristics of expected damage, such as damage that can spread to lower-lying elevations, along a radius across a flood plain or a river bed, among others. These lower-lying elevations, flood plains, river beds, for example, can already be in the data tuples in the geospatial data, and impact damage, for example, can also be coupled or adjusted against building characteristics in the data tuples (e.g., a class 6 building may not be impacted by minor flooding, where a class 1 mobile home may be vulnerable even to minor flooding, but neither is saved in the event of a major storm surge or levee breach). In this example, what is being tracked in this causal graph is that events can be linked to one another (e.g., a tornado is typically linked to supercell thunderstorms and differences in wind-shear at different altitudes). Similarly, a major rain event can have issues that spread from a large amount of precipitation, such as landslides, storm surges, flooding, etc., all with different damage impact zones (e.g., which can simply be modeled as radii or modelled based on more complex path modelling), etc.

Figure 17:
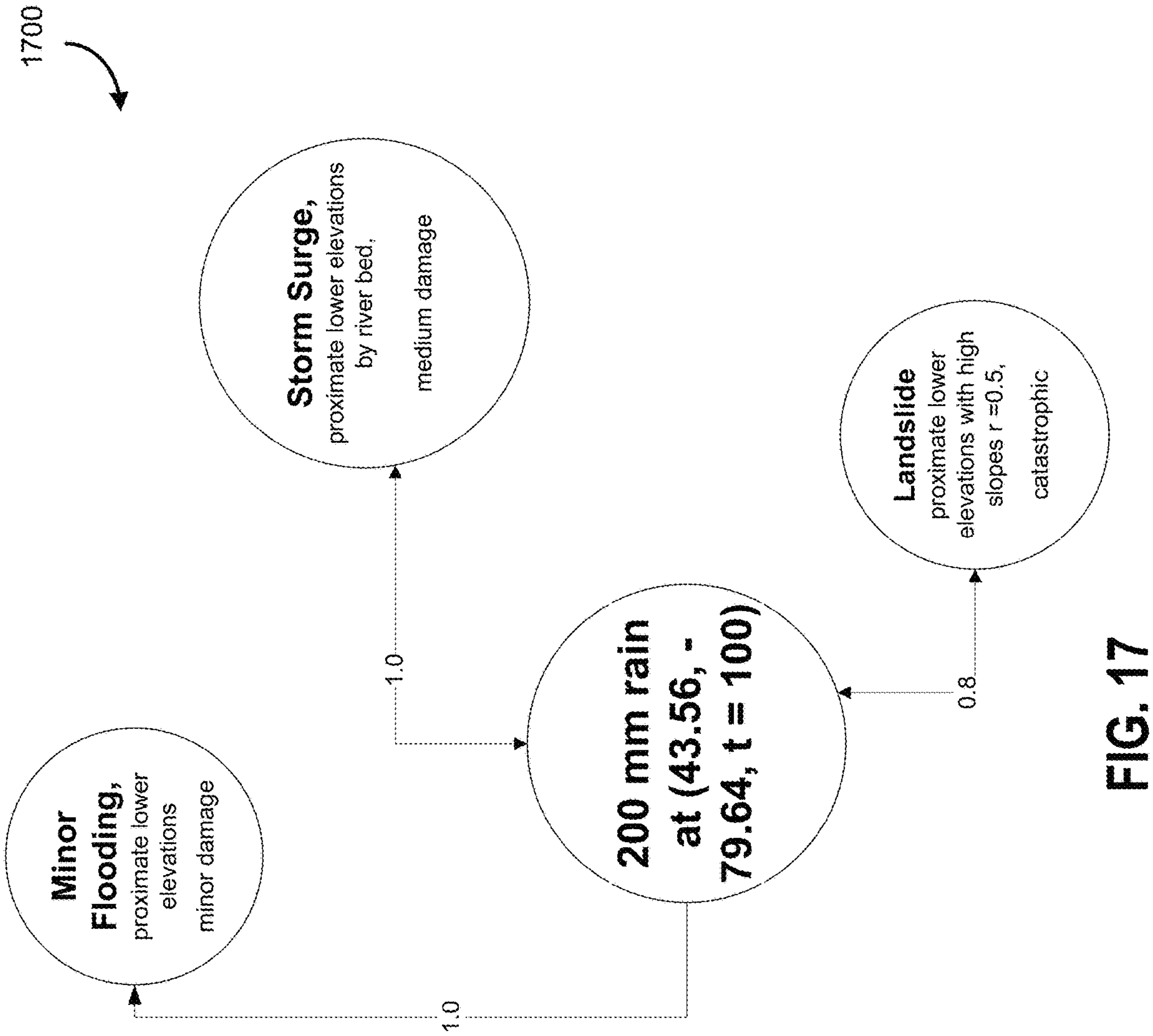

FIG. 17 is an example causal graph 1700 that can be generated, and tuned, during the machine learning training process, according to some embodiments. In FIG. 17 is an example causal graph 1700 that can be generated, and tuned, during the machine learning training process, according to some embodiments. In FIG. 17, a different input is now provided into the system where the rain is much larger at that geospatial point at the point in time. As shown here, the weights and tuning for probabilities and impact can be modified (e.g., definitely flooding, definitely storm surge, likely landslide). The specific weights and tuning can be generated for corresponding non-linear functions and/or transfer functions can be refined iteratively, for example, through minimizing or optimizing a loss factor associated with actual historical events that occurred in the specific region over a period of 1, 10, 100, 1000 years, etc. In some embodiments, for future events or future looking projections, impacts of climate change can also be built into the expected events for generating the potential loss probabilities and impact estimates for generating future projections.

Figure 18:
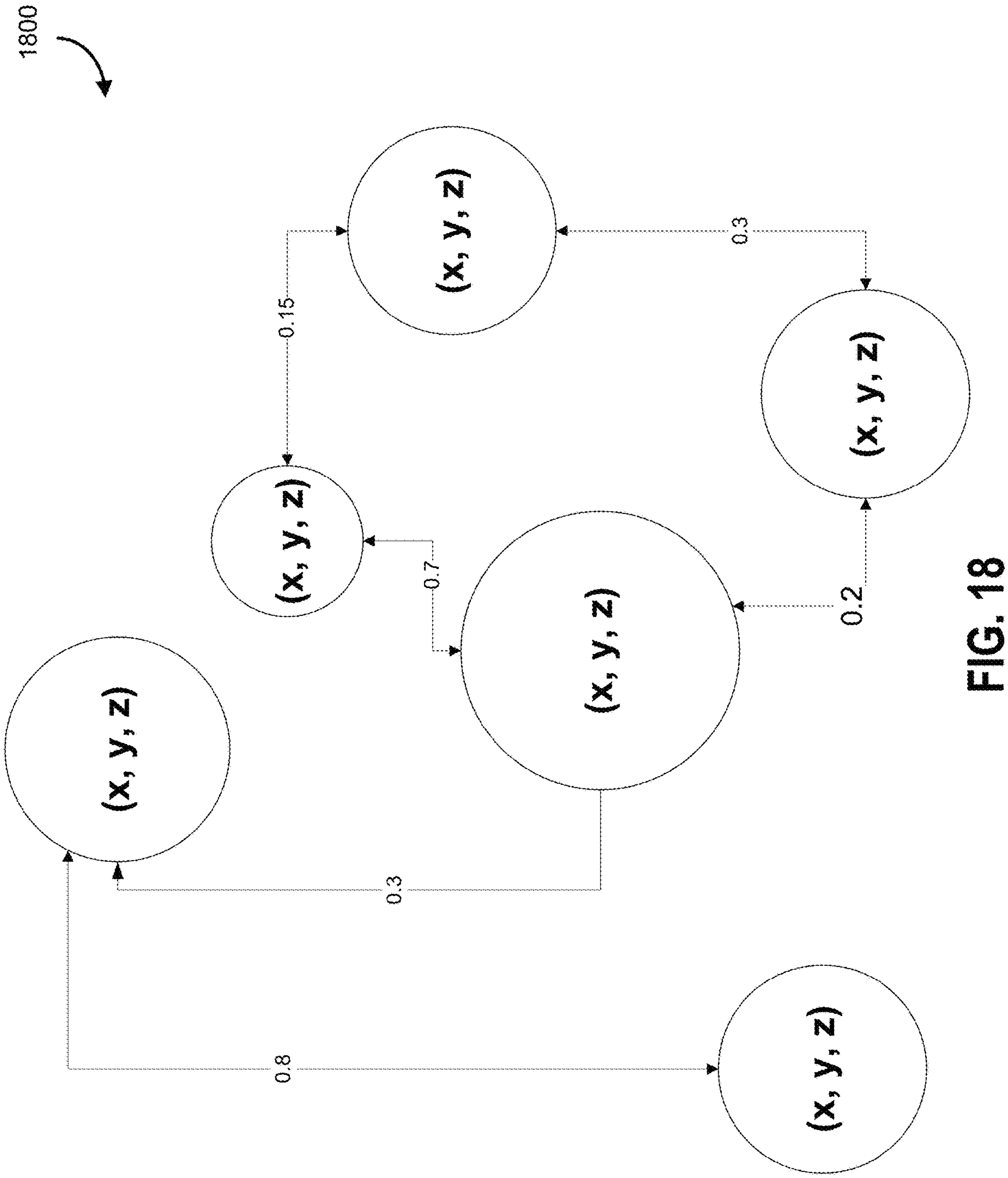

FIG. 18 is a variation example geo-spatial causal graph 1800 that can be generated that can be used separately, or in conjunction, with an event-based causal graph of FIG. 17, and tuned, during the machine learning training process, according to some embodiments. In FIG. 18, each geospatial position can be modelled as as impacting another proximate or neighboring geospatial position in view of various types of events, and the relationships can be modelled such that weights between different points can be established, along with directionality. For example, a rain event at a particular position (x, y), can cause downstream flooding at positions (x1, y1), but not at upstream positions (x2, y2).

Without specifically encapsulating or assessing the elevation or slope differences as between the different positions, in a variation, a causal graph can be trained over time based on historical trends and patterns of impact and damage so that the geospatial points can be linked and weighted. Accordingly, by training such a system, the system does not need a priori determination of basins, elevation differences, etc., and rather, can learn a latent representation of these aspects over time and training iterations. During training, different features can be provided as inputs, such as different confounders, instrumental variables, treatment effects, and these may be adjusted with hyperparameters that can modify the impact and weighting of each of these features. Causal effects can be identified, for example, based on conditioning on various common causes, and if there is an instrumental variable available, one can estimate even if any or none of the common causes of action or outcome are unobserved.

The approach of FIG. 18 is helpful, for example, to provide for a latent representation of path modelling as represented in interconnections between adjacent (or proximate) spatial points. For example, simply because a data point is lower in elevation or in a valley does not necessarily mean that it is in the flood path if the river banks are breached. It may be that that point is actually over porous rock and has historically drained well, but the rock type is an unobserved variable. Conversely, a higher-elevation but poorly draining area may yet flood due to the poor draining capabilities from local flora or human development (e.g., a parking lot).

A benefit of this approach is that this latent representation may also eventually take into account additional features that are not easily represented in characteristics such as rain basins, elevation differences, etc., or corresponding non-linear relationships thereof. For example, a particular geographical feature may be beneficial in flood protection that is simply not shown in any topographical map or survey, such as differences in composition of bedrock, among others, and through the training approach using causal graphs, this can be automatically taken into account through the training of the latent space. If the causal graph is used over a period of time, it can continuously update as un-reported changes are being made in respect of the underlying geospatial elements. For example, the changes could be natural, such as the growing of a mangrove forest that has reduced erosion and improved training, or man-made, such as the introduction of an irrigation canal, etc.

The causal graphs can be used as an additional input signal into certain models by having the models configured to receive the relevant causal graphs as input nodes. In some embodiments, the amount of proximate causal graph or the influence/weighting of same can be adjusted for a particular model to modify how the causal graph impacts the performance of the model. Different combinations of using/not using causal graphs, using them at difference influence levels or granularity/breadth, can be used by different models of an ensemble of models to improve a model selection process so that the system can automatically determine when to take into account the causal graphs, and to what extent. Having the causal graphs pre-trained and/or updated globally is helpful, especially when a large region of causal graphs is input as a signal into some of the models as the computation would otherwise be impractically time-consuming.

As new geospatial data (e.g., flood maps, climate change, historical information) become available, the models can be re-run to assess new adjusted values. A further variant of the system is an on-line system adapted to continuously update based on new data sets as new data is received (e.g., current rain/climate data) so that assessments of geospatial elements and assets can be continuously or periodically updated as time progresses. This is especially useful in a period of evolving climate risks as a tool for monitoring environmental change and generating alerts thereof.

Figure 19:
FIG. 19 is an example process flow diagram showing steps of a computer implemented method, according to some embodiments.

FIG. 19 is an example process flow 1900 showing an example method, according to some embodiments.

At step 1902, the initial data is received indicative of physical contours of assets being considered to define geospatial borders and optionally asset characteristics. For example, a property can include a set of geospatial coordinates corresponding to the property dimensions and lot shape/size, and asset characteristics can also be included, such as type of siding, building code adherence, type of structure, drainage characteristics (e.g., how much is paved over). This information can be obtained from one or more data sources, such as property zoning databases, surveys, etc.

At step 1904, the system can then obtain geospatial information of relevant geospatially related points, and corresponding historical information. This can include geographically proximate region information or geospatial data points, and may be selected, for example, based on a radius around the relevant points of step 1902, or based on information such as all points in a related flood plain, river bed, connected sewer region, etc. Historical information for each point can also be obtained, and this information can include aspects such as 1, 10, 100, 1000 year data, including information such as previous damage, previous types of events, severity, precipitation levels (which may be cyclical), among others. In some embodiments, points are selected to capture proximate types of geographical landmarks, such as coastal water, lakes and rivers, etc. The determination of relevant information to be obtained, for example, may be based on polygons specifying the boundaries of different geophysical bodies, such as bodies of water, and or obtained from geophysical data sets, such as coastal water, lake, and river data sets, etc.

At step 1906, different models having perturbed methodologies can be instantiated, and trained based on the historical data. Depending on training parameters, the training can be adapted for generating 1, 10, 100, 1000 year risk profiles, or an aggregation thereof. In some embodiments, simultaneously, or consecutively, causal graphs linking events and/or different geospatial points can also be trained. This is useful, for example, where the causal graphs are also fed as inputs into the models, and the causal graphs are utilized for tracking otherwise non-observed or highly non-linear relationships in a latent representation that is built over iterative development. As the causal graphs may require a large amount of computing effort or processing power to generate at a meaningful level of granularity and resolution, in some embodiments, the causal graphs are cached as global causal graphs and improved upon each training iteration and/or running of queries so that the causal graphs over time covering each particular region or point are improved using the combined processing power across multiple runs.

At step 1908, the model outputs can be analyzed for refutation and/or selection, and in some embodiments, this can be based on comparison against performance on a validation set if ground truth is available, or if there is no ground truth available, it can be analyzed for consistency amongst one another. A best model or set of models can be selected for usage.

At step 1910, predictive outputs can be used by utilizing the selected model(s) against a particular desired query, such as identifying the risk profile for a property A for a 25 year period of time. In an embodiment, the causal graphs are also provided as an input alongside the physical contour information of the query, such that the models are adapted to refine their outputs using a combination thereof. Using causal graphs in this manner is helpful as the causal graphs can help capture non-linearities or relationships that are difficult or otherwise unobserved in geospatial and/or physical characteristic data, and as noted above, where the causal graphs are gradually improved with each query, a large amount of computing processing can be offset or otherwise spread across a large number of queries. For example, if there is information about rainfall and damage, but no information about bedrock type, the causal graphs, over time, through the latent representations, provide a signal indicating that perhaps in areas where there are limestone bedrock, there is less damage or impact due to the porosity of the bedrock.

At step 1912, different outputs can be established, such as Set 1 outputs or refined Set 2 outputs, and these can be used as inputs to initiate other downstream system data processes, such as setting insurance premium amounts based on a granular analysis of each property and its corresponding contours, automatically requiring particular policies or conditions for particular properties (e.g., requiring sump pumps as a condition of insurance), automatically identifying undervalued or overvalued properties for automatic transactions, etc.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized. Accordingly, the embodiments are intended to include within their scope such processes, machines, manufacture, compositions of matter, means, methods, or steps.

As can be understood, the examples described above and illustrated are intended to be exemplary only.

What is claimed is:

1. A machine learning system for generating predictive output data representative of event-adjusted characteristics of physical geospatial objects, the machine learning system comprising:

data receiver configured to receive a first data set representative of geospatial event-based data and a second data set representative of the characteristics of the physical geospatial objects;

a processor configured to:

conduct a spatial join of the first data set and the second data set to generate a combined data set mapping characteristics of the physical geospatial objects to geospatially neighboring event-based data based on geospatial polygons;

generate or update a causal graph data model based on the combined data set, the causal graph data model being maintained as a global causal graph data model that is cached and periodically updated whenever geospatial data is being used to train models for generating predictive outputs, the global causal graph data model being improved upon each training iteration and running of queries using combined processing power across multiple runs; and provide the combined data set and the causal graph data model to a trained regression machine learning model, a trained causal machine learning model, and a trained similarity machine learning model to generate the predictive output data representative of the event-adjusted characteristics of the physical geospatial objects;

wherein the trained regression machine learning model, the trained causal machine learning model, and the trained similarity machine learning model are used simultaneously or concurrently to generate the predictive output data representative of the event-adjusted characteristics of the physical geospatial objects, the global causal graph data model being provided as an additional input signal to one or more of the trained regression machine learning model, the trained causal machine learning model, and the trained similarity machine learning model.

2. The machine learning system of claim 1, wherein the processor is configured to select between the trained regression machine learning model, the trained causal machine learning model, and the trained similarity machine learning model for generation of the predictive output data.

3. The machine learning system of claim 1, wherein the predictive output data representative of the event-adjusted characteristics of the physical geospatial objects further includes stability and refutation data indicative of consistency or confidence in the generation of the event-adjusted characteristics of the physical geospatial objects.

4. The machine learning system of claim 1, wherein the first data set is flood occurrence data.

5. The machine learning system of claim 1, wherein the second data set is property data.

6. The machine learning system of claim 1, wherein the first data set and the second data set have different geospatial data encoding schemas.

7. The machine learning system of claim 1, wherein the event-adjusted characteristics of the physical geospatial objects are processed to generate a further set of event-adjusted characteristics of the physical geospatial objects based on spatial aggregations.

8. The machine learning system of claim 1, wherein intermediate outputs of the trained regression machine learning model, the trained causal machine learning model, or the trained similarity machine learning model are stored in cache memory and retrieved on a future query if a same query is executed.

9. The machine learning system of claim 1, wherein the causal graph data model is established during supervised training iterations.

10. The machine learning system of claim 1, wherein the event-adjusted characteristics of the physical geospatial objects include flood-risk adjusted characteristics of property values.

11. A method for generating predictive output data representative of event-adjusted characteristics of physical geospatial objects, the method comprising:

receiving a first data set representative of geospatial event-based data and a second data set representative of the characteristics of the physical geospatial objects;

conducting a spatial join of the first data set and the second data set to generate a combined data set mapping characteristics of the physical geospatial objects to geospatially neighboring event-based data based on geospatial polygons;

generating or updating a causal graph data model based on the combined data set, the causal graph data model being maintained as a global causal graph data model that is cached and periodically updated whenever geospatial data is being used to train models for generating predictive outputs, the global causal graph data model being improved upon each training iteration and running of queries using combined processing power across multiple runs; and providing the combined data set and the causal graph data model to a trained regression machine learning model, a trained causal machine learning model, and a trained similarity machine learning model to generate the predictive output data representative of the event-adjusted characteristics of the physical geospatial objects;

wherein the trained regression machine learning model, the trained causal machine learning model, and the trained similarity machine learning model are used simultaneously or concurrently to generate the predictive output data representative of the event-adjusted characteristics of the physical geospatial objects, the global causal graph data model being provided as an additional input signal to one or more of the trained regression machine learning model, the trained causal machine learning model, and the trained similarity machine learning model.

12. The method of claim 11, comprising selecting between the trained regression machine learning model, the trained causal machine learning model, and the trained similarity machine learning model for generation of the predictive output data.

13. The method of claim 11, wherein the predictive output data representative of the event-adjusted characteristics of the physical geospatial objects further includes stability and refutation data indicative of consistency or confidence in the generation of the event-adjusted characteristics of the physical geospatial objects.

14. The method of claim 11, wherein the first data set is flood occurrence data.

15. The method of claim 11, wherein the second data set is property data.

16. The method of claim 11, wherein the first data set and the second data set have different geospatial data encoding schemas.

17. The method of claim 11, wherein the event-adjusted characteristics of the physical geospatial objects are processed to generate a further set of event-adjusted characteristics of the physical geospatial objects based on spatial aggregations.

18. The method of claim 11, wherein intermediate outputs of the trained regression machine learning model, the trained causal machine learning model, or the trained similarity machine learning model are stored in cache memory and retrieved on a future query if a same query is executed.

19. The method of claim 11, wherein the causal graph data model is established during supervised training iterations.

20. A non-transitory computer readable medium storing machine interpretable instruction sets, which when executed by a processor, cause the processor to perform a method for generating predictive output data representative of event-adjusted characteristics of physical geospatial objects, the method comprising:

receiving a first data set representative of geospatial event-based data and a second data set representative of the characteristics of the physical geospatial objects;

conducting a spatial join of the first data set and the second data set to generate a combined data set mapping characteristics of the physical geospatial objects to geospatially neighboring event-based data based on geospatial polygons;

generating or updating a causal graph data model based on the combined data set, the causal graph data model being maintained as a global causal graph data model that is cached and periodically updated whenever geospatial data is being used to train models for generating predictive outputs, the global causal graph data model being improved upon each training iteration and running of queries using combined processing power across multiple runs; and providing the combined data set and the causal graph data model to a trained regression machine learning model, a trained causal machine learning model, and a trained similarity machine learning model to generate the predictive output data representative of the event-adjusted characteristics of the physical geospatial objects;

wherein the trained regression machine learning model, the trained causal machine learning model, and the trained similarity machine learning model are used simultaneously or concurrently to generate the predictive output data representative of the event-adjusted characteristics of the physical geospatial objects, the global causal graph data model being provided as an additional input signal to one or more of the trained regression machine learning model, the trained causal machine learning model, and the trained similarity machine learning model.

* * * * *